US010467021B2

(12) United States Patent
Nguyen et al.

(10) Patent No.: US 10,467,021 B2
(45) Date of Patent: *Nov. 5, 2019

(54) HIGH DENSITY MULTI NODE COMPUTER WITH IMPROVED EFFICIENCY, THERMAL CONTROL, AND COMPUTE PERFORMANCE

(71) Applicant: Advanced Green Computing Machines-IP, Limited, Hong Kong (CN)

(72) Inventors: Tung M. Nguyen, Cupertino, CA (US); Syed Najaf Rizvi, Livermore, CA (US); David Nguyen, Santa Clara, CA (US); Adam Drobot, Wayne, PA (US); Eric Anderson, Sunnyvale, CA (US)

(73) Assignee: Advanced Green Computing Machines-IP, Hong Kong (CN)

( * ) Notice: Subject to any disclaimer, the term of this patent is extended or adjusted under 35 U.S.C. 154(b) by 175 days.

This patent is subject to a terminal disclaimer.

(21) Appl. No.: 15/264,441

(22) Filed: Sep. 13, 2016

(65) Prior Publication Data

US 2017/0052801 A1 Feb. 23, 2017

Related U.S. Application Data

(63) Continuation-in-part of application No. 12/634,441, filed on Dec. 9, 2009, now Pat. No. 9,442,540.
(Continued)

(51) Int. Cl.
*G06F 9/445* (2018.01)
*G06F 1/20* (2006.01)
(Continued)

(52) U.S. Cl.
CPC .......... *G06F 9/44505* (2013.01); *G06F 1/181* (2013.01); *G06F 1/189* (2013.01);
(Continued)

(58) Field of Classification Search
None
See application file for complete search history.

(56) References Cited

U.S. PATENT DOCUMENTS 5,513,324 A 4/1996 Dolin, Jr. et al.
6,266,740 B1 7/2001 Don et al.
(Continued)

FOREIGN PATENT DOCUMENTS

KR 1020047008304 A 3/2005
WO 03042829 A2 5/2003

*Primary Examiner* — Henry Tsai
*Assistant Examiner* — Aurangzeb Hassan

(57) ABSTRACT

A multi-node computer system, comprising: a plurality of nodes, a system control unit and a carrier board. Each node of the plurality of nodes comprises a processor and a memory. The system control unit is responsible for: power management, cooling, workload provisioning, native storage servicing, and I/O. The carrier board comprises a system fabric and a plurality of electrical connections. The electrical connections provide the plurality of nodes with power, management controls, system connectivity between the system control unit and the plurality of nodes, and an external network connection to a user infrastructure. The system control unit and the carrier board provide integrated, shared resources for the plurality of nodes. The multi-node computer system is provided in a single enclosure.

26 Claims, 17 Drawing Sheets

Related U.S. Application Data

(60) Provisional application No. 61/238,084, filed on Aug. 28, 2009.

(51) Int. Cl.
*G06F 1/26* (2006.01)
*G06F 1/18* (2006.01)
*G06F 13/40* (2006.01)

(52) U.S. Cl.
CPC .................. *G06F 1/20* (2013.01); *G06F 1/26* (2013.01); *G06F 13/4068* (2013.01); *Y02D 10/14* (2018.01); *Y02D 10/151* (2018.01)

(56) References Cited

U.S. PATENT DOCUMENTS

| | | | |
|---|---|---|---|
| 6,725,328 B2 | 4/2004 | Kano et al. | |
| 6,978,332 B1 | 12/2005 | Harris et al. | |
| 7,215,535 B2 | 5/2007 | Pereira | |
| 7,481,679 B1 * | 1/2009 | Stotz | H01R 12/7029 439/638 |
| 7,538,453 B1 | 5/2009 | Roux et al. | |
| 8,014,388 B2 | 9/2011 | Edwards, III et al. | |
| 2003/0229814 A1 | 12/2003 | Garnett | |
| 2003/0236745 A1 | 12/2003 | Hartsell et al. | |
| 2004/0107375 A1 | 6/2004 | Anglada | |
| 2004/0180653 A1 | 9/2004 | Royalty | |
| 2004/0243798 A1 | 12/2004 | Goud et al. | |
| 2004/0255171 A1 | 12/2004 | Zimmer et al. | |
| 2005/0091215 A1 | 4/2005 | Chandra et al. | |
| 2005/0138285 A1 | 6/2005 | Takaoka et al. | |
| 2005/0210188 A1 | 9/2005 | Mizuno et al. | |
| 2006/0280196 A1 * | 12/2006 | Overgaard | H04L 41/24 370/425 |
| 2007/0047195 A1 | 3/2007 | Merkin et al. | |
| 2007/0069585 A1 | 3/2007 | Bosco et al. | |
| 2007/0109740 A1 | 5/2007 | Drapeau | |
| 2007/0113025 A1 | 5/2007 | Ozaki et al. | |
| 2008/0005508 A1 | 1/2008 | Asano et al. | |
| 2008/0071982 A1 | 3/2008 | Kanno et al. | |
| 2008/0114955 A1 | 5/2008 | Kitayama et al. | |
| 2008/0195562 A1 | 8/2008 | Worth et al. | |
| 2008/0235448 A1 | 9/2008 | Inoue et al. | |
| 2008/0278912 A1 * | 11/2008 | Zavadsky | H04Q 1/02 361/697 |
| 2008/0310097 A1 | 12/2008 | Sherrod et al. | |
| 2009/0037657 A1 | 2/2009 | Bresniker | |
| 2009/0077552 A1 | 3/2009 | Sekiguchi et al. | |
| 2009/0307514 A1 | 12/2009 | Roberts et al. | |
| 2010/0235648 A1 | 9/2010 | Hoang et al. | |
| 2012/0011314 A1 | 1/2012 | Yochai et al. | |
| 2013/0346667 A1 | 12/2013 | Stroud et al. | |

* cited by examiner

HIGH DENSITY MULTI NODE COMPUTER WITH IMPROVED EFFICIENCY, THERMAL CONTROL, AND COMPUTE PERFORMANCE

CROSS-REFERENCES TO RELATED APPLICATIONS

This application claims the benefit of U.S. patent application Ser. No. 12/634,441, filed Dec. 9, 2009, which claims priority to U.S. Provisional Patent Application No. 61/238,084, filed Aug. 28, 2009. U.S. patent application Ser. No. 12/634,441 is incorporated by reference in its entirety herein as if it were put forth in full below.

TECHNICAL FIELD

This invention generally relates to computer systems, and more particularly to network-centric computer architectures, that make use of components from consumer electronics including sub-5 W low power processors, which provide improvements in power, space and cooling.

BACKGROUND

With the increasing popularity and advantages of paperless technology, digital information storage and information management through the use of data centers has emerged as an arguably essential part of commerce, communications, education, and government functionality. A data center, or server farm, provides the necessary computer systems required for data processing, data storage, telecommunications and Internet connectivity. Data centers have become ubiquitous and are found in banking, entertainment, news outlets, high-technology industry, universities, and governmental institutions, to name just a few. These and others like them operate or make use of such data centers to aid in business transactions, information management, telecommunications, data processing demands.

With the growth in popularity and use of paperless technology, the use of data centers has grown as well. Demands on data centers are increasing with the increased use of electronic transaction in banking, the popularity of internet communications and entertainment, the rising use of electronic medical records, as well as the growth seen in e-commerce, to list but a few of the many factors. Since 2000, according to an EPA report to Congress, increasing demand for computer resources has led to significant growth in the number of data center servers, along with an estimated 5× increase in the energy used by these servers and the power and cooling infrastructure that supports them. The EPA report notes that this five-fold increase in energy use translates into increased energy costs, increased emissions from electricity generations with accompanying greenhouse gas emissions, along with the added strain to the current power grid required to meet this increased power requirement, not to mention the added capital expenses required for the expansion of current data center capability as well as cost associated with the construction of new data centers.

Therefore, with the rising interest in improved energy efficiency in all sectors of society, there has also been mounting interest in improving the energy efficiency of data centers as well. Several new technologies providing energy efficiency solutions include blade servers and adaptive cooling. According to the International Data Corporation (IDC), blade server shipment will exceed 40% of world wide server shipments by 2013. However, all the improvements are incremental and evolutionary. It is clear that in order to bring the power consumption down to the 2000 level, new breakthroughs in system technology and architecture are needed.

SUMMARY OF THE INVENTION

In one embodiment of the present invention, a multi-node computer system comprises a plurality of nodes, a system control unit and a carrier board. Each node of the plurality of nodes comprises a processor and a memory. The system control unit is responsible for: power management, cooling control, workload provisioning, native storage servicing, and I/O. The carrier board comprises a system fabric and a plurality of electrical connections. The electrical connections provide the plurality of nodes with power, management controls, system connectivity between the system control unit and the plurality of nodes, and an external network connection to a user infrastructure. The system control unit and the carrier board provide integrated, shared resources for the plurality of nodes. The multi-node computer system is provided in a single enclosure.

In a further embodiment of the present invention, the multi-node computer system further comprises a single-system power supply. The carrier board further comprises a plurality of electrical connections, wherein the plurality of nodes is arranged on the carrier board, each to a respective electrical connection. The power supply provides a single voltage level to the plurality of nodes, each node individually converting the voltage.

In a further embodiment of the present invention, the plurality of nodes are arranged vertically on the carrier board in a first row of nodes and a second row of nodes. The first row of nodes is orientated differently from the second row of nodes. The rows of nodes form channels between the nodes. The plurality of channels is divided into a plurality of zones, each zone comprising at least one channel. A plurality of fans provide fan-forced air for cooling the plurality of nodes by forcing air down the channels, each fan providing fan-forced air for at least one zone.

In a further embodiment of the present invention, a node of the multi-node computer system further comprises: a processor requiring less than 5 watts; a memory; a memory controller; an I/O chipset; a system interconnect; and a service processor. The node uses less than 50 watts and is incapable of independent operation. The node connects to a carrier board as one of a plurality of nodes of a multi-node computer system in a single enclosure. Each node has no individual enclosure.

DETAILED DESCRIPTION

Figure 1:
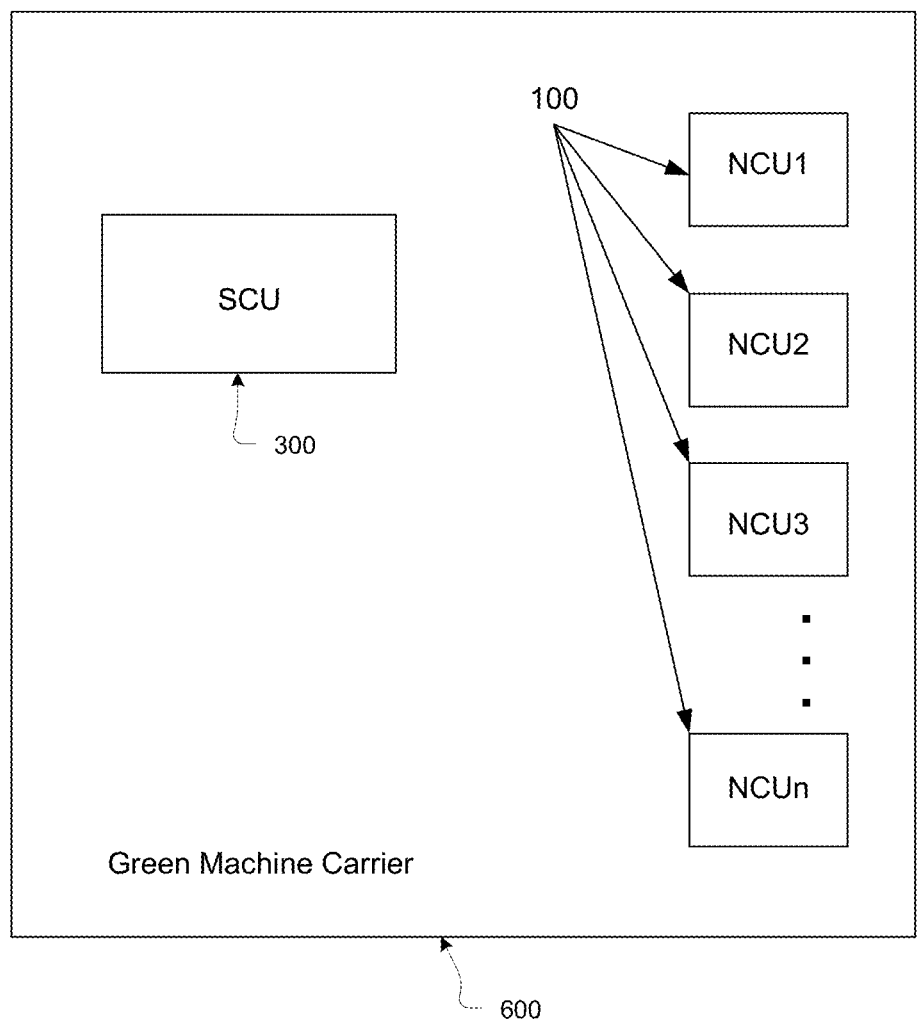
FIG. 1 is a simplified block diagram illustrating a multi-node computer in accordance with an embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., multi-node computer system 10 of FIG. 1), or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

In the last 40 years, there have been waves of computing architectures. From mainframe to mini-computers to RISC workstations and servers to the current x86 systems: each new wave has ushered in significant improvements in performance, price and power. Considering the enormous investments that have gone into technology development for low power processor and flash memory targeting consumer devices such as iPhones™, netbooks, mobile internet devices (MIDs), and digital video cameras, etc., it is becoming apparent that the next wave will be based on these fundamental consumer electronics technologies.

GreenMachine

The GreenMachine™ multi-node computer system is an I/O and Network-centric architecture targeting 10× or more improvement in power, space and cooling over current computer architectures. A multi-node computer system comprises a plurality of nodes, an individual node for each user. A single user may use/control a single node or several nodes at a time. Each node comprises random access memory and separate processing resources defined by the capabilities of the individual nodes. The processing subsystem (of each node) of the GreenMachine is based on the type of low power processors which are in smart phones/mobile internet device, and flash memory technology. The initial target market is Cloud Computing, because of the I/O, low power requirements, and computing performance. GreenMachine may also be deployed in other key verticals including Thin Client/Virtual Desktop, Database, Data Warehouse, Business Intelligence and Business Analytics, and High Performance Computing (HPC).

FIG. 1 illustrates a multi-node computer system 10 in accordance with an embodiment of the present invention. Each GreenMachine multi-node computer system 10 is comprised of modular building blocks called NanoCompute Units™ (NCUs) 100, which are interconnected via a carrier board utilizing a dual redundant scalable system fabric called a GreenMachine Carrier™ (GMC) 600. The NCUs 100 are individual nodes of the multi-node computer system. In the present invention, each node functions as a "separate" computer system with its own physically separate processor and memory, while other resources (e.g. power, cooling, I/O, etc.), as discussed further below, are shared among the nodes. A management subsystem, called a System Control Unit (SCU) 300, is responsible for power management, cooling, workload provisioning, native storage serving, and I/O. The GMC 600 provides power, management controls, and system connectivity between the SCU 300 and the NCUs 100, and an external network connection to the user infrastructure. The SCU 300 and the GMC 600 provide integrated shared resources for the plurality of NCUs 100.

There are two existing types of computer systems which feature superficial similarities to the GreenMachine multi-node computer system 10. Clusters of blade servers are also comprised of modular computational building blocks connected via system fabrics, and often also contain a management subsystem. However, the GreenMachine 10 uniquely differs in that: 1) all building blocks are housed within a single enclosure, as opposed to being a collection of individually housed components; and 2) the entire GreenMachine enclosure requires a fraction of the power, space, and cost of an equivalently equipped blade system. Multi-node computers, which are less common, may also consist of multiple modular computing elements inside a single enclosure. There are several differences between a GreenMachine multi-node computer 10 and existing multi-node computers, however. First, the GreenMachine 10 contains mechanisms to interconnect its multiple NCUs 100 within the GMC 600 without requiring external cabling and additional switches. Further, the GreenMachine 10 contains management subsystems to facilitate the operation and ease of use of the nodes. And lastly, the GreenMachine 10 contains several times the number of nodes as compared to any other multi-node computer today, while consuming less power and space. The GreenMachine 10 is the first multi-node computer to provide its features and functionality in such a compact power, space, and cost footprint.

There are also several advantages that the GreenMachine 10 enjoys over conventional computer systems using virtual environments for multiple users. Because each user under GreenMachine is provided an individual NCU 100, rather than a partitioned fraction of the total processing resources as a virtual computer, there is consistency and improved fault isolation. Regardless of the number of users, the processing resources available to the users on a GreenMachine 10 will not vary, but the resources available to a user utilizing a virtual computing environment may vary based on the aggregate processing demands of the users. Further, should a processor fail in a virtual computing environment, multiple users may be affected, while in the GreenMachine system 10, when an NCU 100 fails, only a single user is affected.

The various components of the GreenMachine 10 (e.g. NCUs 100, SCU 200, and GMC 600) will now be discussed in greater detail. Following a detailed description of the components of the GreenMachine 10, the architecture, physical assembly, efficient cooling implementation, and single-source power supply distribution of the GreenMachine will be discussed, followed by a discussion of further GreenMachine embodiments.

NanoCompute Unit (NCU)

Figure 2:
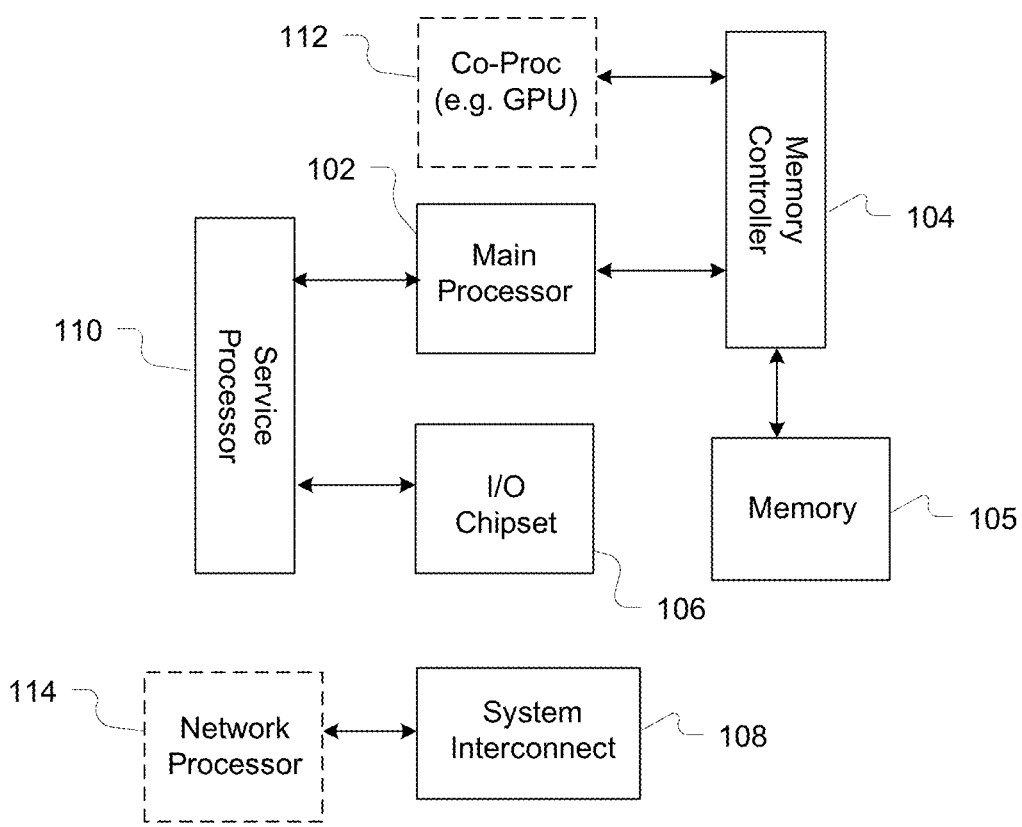
FIG. 2 is a block diagram illustrating a NanoCompute Unit (NCU) in accordance with an embodiment of the present invention.

FIG. 2 illustrates a NanoCompute Unit (NCU) 100 in accordance with an embodiment of the present invention. The NCU 100 comprises: a main processor 102, a memory controller 104, a random access memory 105, a chipset 106, a system interconnect 108, and a service processor 110. In a further embodiment, a co-processor 112 (e.g. graphics processor unit and floating point arithmetic unit) and/or a network processor 114 may be included to offload the NCU main processor 102 and enhance application performance.

The NCU 100 is processor independent. The NCU 100 will support sub-5 W processors such as Intel's Atom™ and ARM processors. The chipset 106 connects the main processor 102 to memory 104. The service processor 110 provides system console access with video and USB for remote client devices for example, a keyboard, mouse, and DVD/CD ROM, etc. A network interconnect is implemented through an Ethernet network interface (NIC). The Ethernet network interface optionally includes the network processor 114. The network processor 114 offloads the NCU main processor 102 with a network protocol offload engine. For reliability, each NCU 100 is equipped with at least two high speed system interfaces (1 Gbps or faster) on the Ethernet network interface. These interfaces could be network interconnects (e.g. Ethernet) or I/O interconnects (e.g. PCIe). The service processor 110 is connected to the System Control Unit (SCU) 300 and provides IPMI 2.0 management via a dedicated network interface or IPMB. KVM and USB redirection for the NCU 100 are provided via the dedicated network interface on the service processor 110. The service processor 110 includes a built-in Ethernet controller with a single dedicated network interface which connects to external networks through the GreenMachine carrier 600. Like a standard computer, each NCU 100 runs its own operating system instance. Combined with the remote client devices, each NCU 100 will function as a single node of the multi-node computer system 10. No NCU 100 local connections or I/O ports are exposed externally outside of the GreenMachine 10.

Unable to function independently as a stand-alone computer (lacking an integrated power supply, fans, and storage, for example . . . ), and unlike stand-alone computers or many server blade configurations, the bare-bones NCU 100 enjoys a low wattage requirement threshold. Utilizing sub-5 W processors, with further reduced processing requirements for the processors, each individual NCU 100 will use no more than 35-50 watts.

Figure 3:
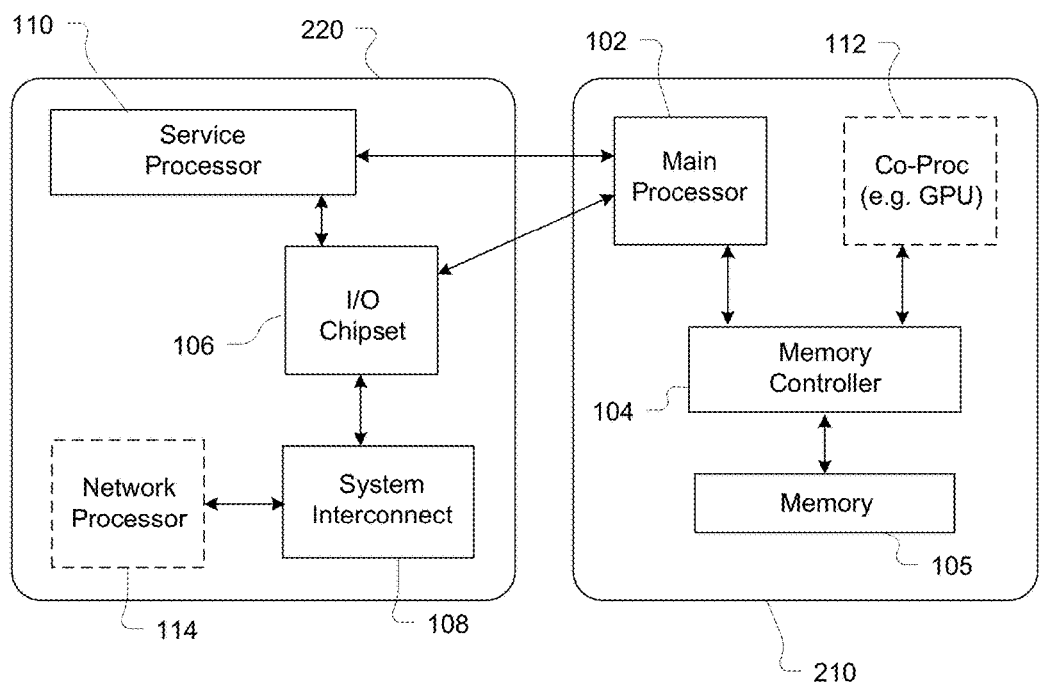
FIG. 3 is a block diagram illustrating a 2-chip NanoCompute Unit (NCU) implementation in accordance with an embodiment of the present invention.

The current trend is to integrate key chipset functions such as a memory controller into the main processor leveraging high density process technologies (e.g. 32 nm), which are fueling the consumer electronics wave. The NCU may be implemented as a single chip or 2-chip solution. FIG. 3 illustrates a 2-chip NCU 200 in accordance with an embodiment of the present invention. The NCU 200 is implemented as a 2-chip solution with a first chip 210 integrating a memory controller 104, a random access memory 105, and a GPU 112 with a main processor 102, with the rest of the NCU's 200 components integrated in the second chip 220 comprising: an I/O chipset 106, a Service Processor 110, a System Interconnect 108, and a Network Processor 114. The second chip also provides boot support, either through the I/O chipset 106 connected to a boot device (e.g., a hard drive or other storage media), or by a network processor connected through the network interface in the service processor 110 to a remote boot device.

System Control Unit (SCU)

Figure 4:
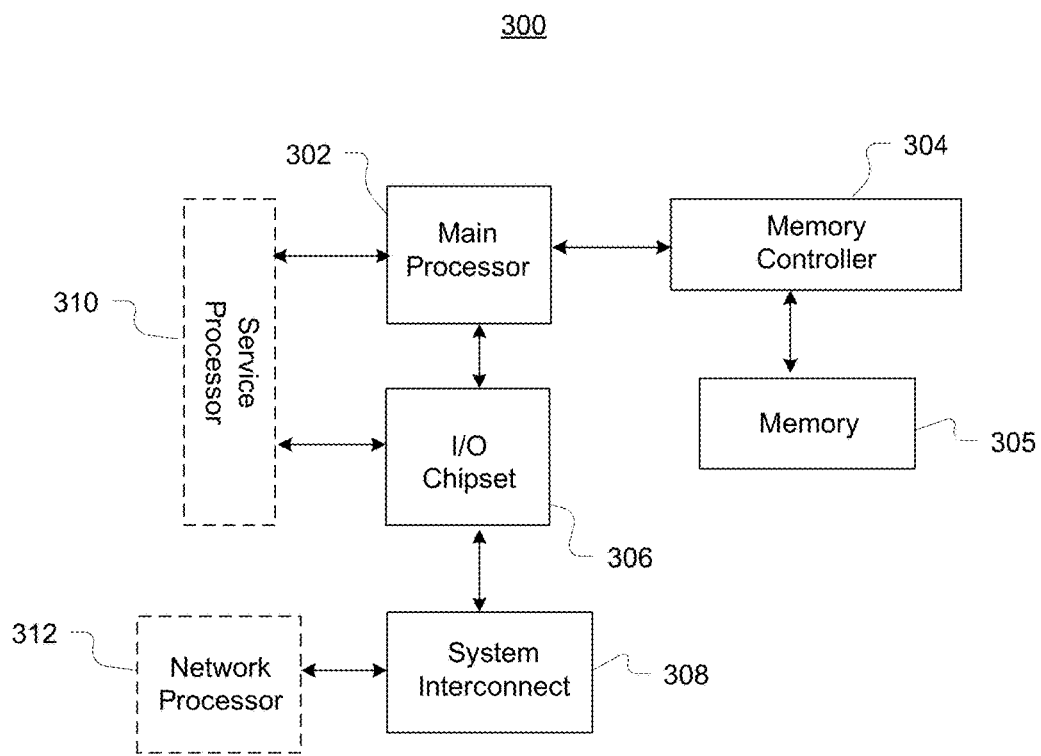
FIG. 4 is a block diagram illustrating a System Control Unit (SCU) in accordance with an embodiment of the present invention.

The System Control Unit (SCU) is responsible for power management, cooling control, workload provisioning, native storage serving, and I/O. The SCU runs a custom system firmware called NanoCompute Center (NCC). FIG. 4 illustrates a system control unit 300 in accordance with an embodiment of the present invention. The SCU 300 comprises: a main processor 302, a memory controller 304, a random access memory 305, a chipset 306, and a system interconnect 308. In a further implementation, a service processor 310 is also provided. In a further implementation, a Network Processor 312 may also be included to offload the NCU main processor 102 and enhance application performance. Network offloading indirectly enhances application performance. The network offloading will assist the SCU in providing services, such as shared storage, to NCUs. The higher quality service will result in improved application performance. In addition, the SCU 300 provides internal storage interfaces through the I/O chipset 106 (e.g. SATA), system switch fabrics management interfaces through a serial port located on the I/O chipset 106, high speed storage network interfaces through the network interfaces of the network processor 114, and externally accessible I/O ports through the I/O chipset 106 (e.g. Video, USB, etc.).

Figure 5:
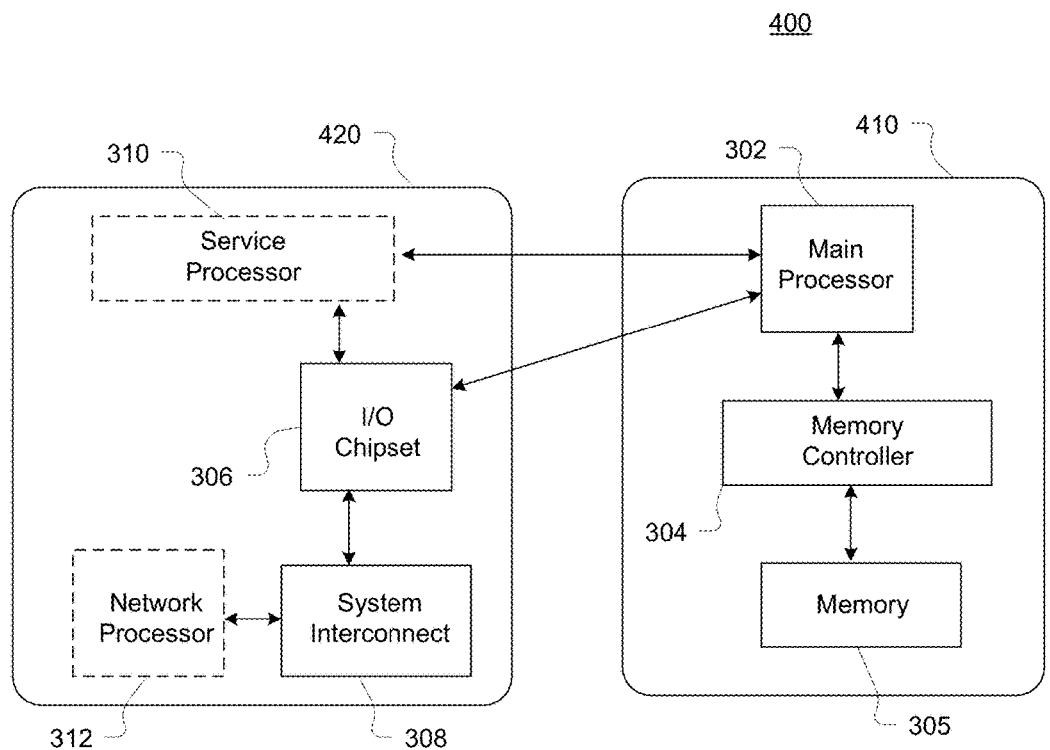
FIG. 5 is a block diagram illustrating a 2-chip System Control Unit (SCU) in accordance with an embodiment of the present invention.

The current trend is to integrate key chipset functions such as integrating the memory controller into the main processor, leveraging high density process technologies (e.g. 32 nm), which are fueling the consumer electronics wave. Therefore, the SCU can also be implemented as a single or 2-chip solution. As illustrated in FIG. 5, the SCU 400 may be implemented as a 2-chip solution with a first chip 410 integrating a memory controller 304 and a random access memory 305 with a main processor 302, while the rest of the components of the SCU 400 are integrated in a second chip 420 comprising: a chipset 306, a service processor 310, a system interconnect 308 and a network processor 312. The second chip 420 also provides boot support).

NanoCompute Center (NCC)

Figure 6:
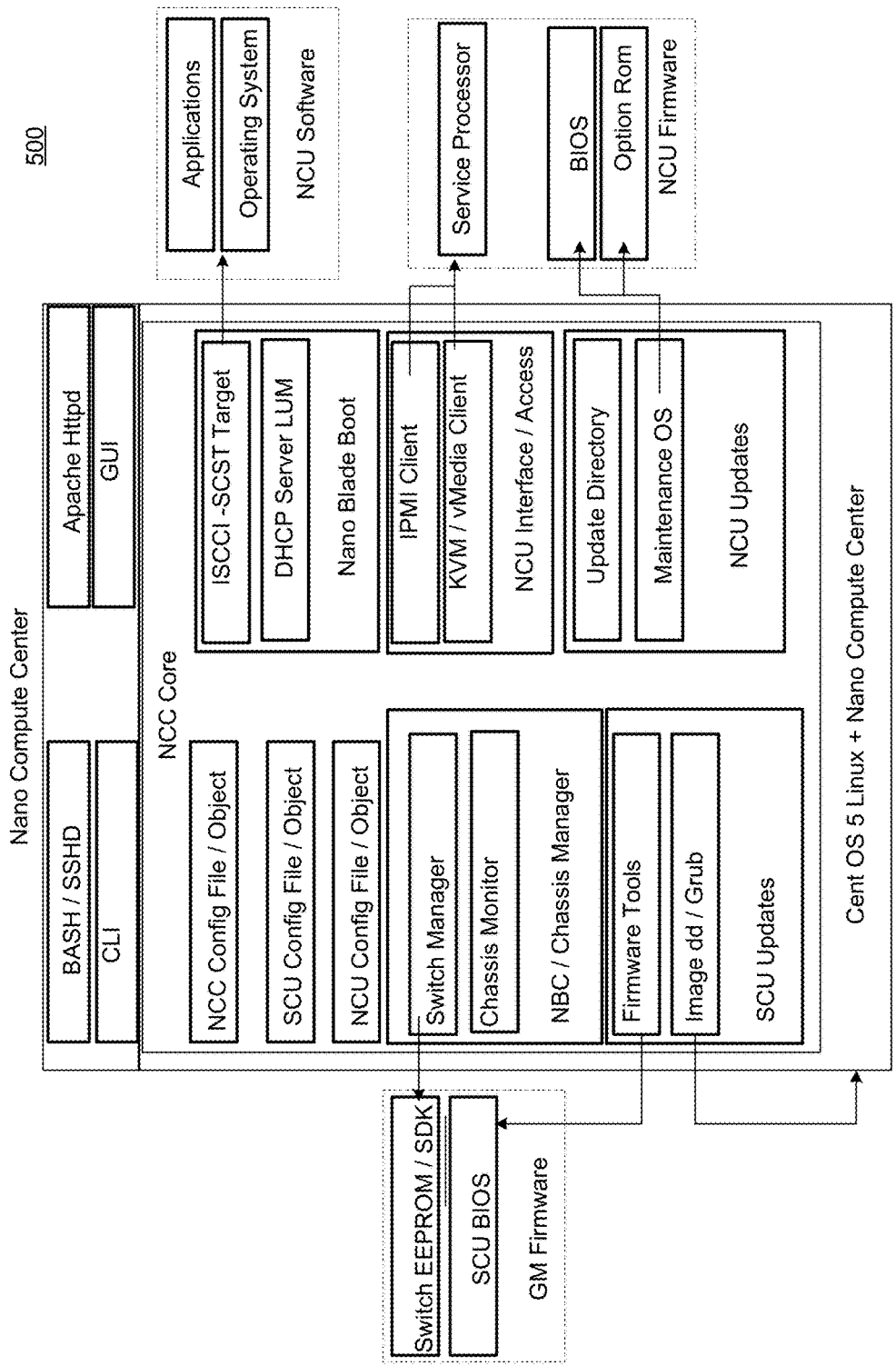
FIG. 6 is block diagram illustrating a NanoCompute Center Software Design/Architecture implementation in accordance with an embodiment of the present invention.

The SCU 300 runs a custom system firmware called NanoCompute Center™ (NCC). The main software and firmware components, as well as their sub-components, are illustrated in FIG. 6, in accordance with an embodiment of the present invention. The software and firmware components and sub-components comprise open source, 3rd party software, as well as software developed specifically for the NCC. The NanoCompute Center comprises: BASH/SSHD utilities, an Apache Httpd server; Command Line Interface (CLI); a Graphical User Interface (GUI); CentOS 5 Linex+ NanoCompute Center; and an NCC Core. The NCC Core comprises the following modules: NCC, SCU and NCU Config File/Objects, NanoBlade Boot; NCU Interface/Access; NCU Updates; SCU updates; and NBC/Chassis Manager. The NanoBlade Boot comprises a Logical Volume Manager (LVM); a DHCP Server and an iSCSI-SCST Target. The iSCSI-SCST Target communicates with NCU Software comprising Applications and an Operating System. The NCU Interface/Access comprises: an IPMI Client and a KVM/vMedia Client, both communicating with Service Processors of the NCU Firmware. The NCU Updates comprise an Update Director and a Maintenance OS, the Maintenance OS communicating with a BIOS and an Option ROM of the NCU Firmware. The SCU Updates comprise: Firmware Tools, and an Image dd/Grub Application. The Firmware Tools communicating with the SCU BIOS of the GM Firmware, and the Image dd/Grub Application communicating with the CentOS 5 Linux+NanoCompute Center. The NBC/Chassis Manager comprises a Switch Manager and a Chassis Manager, the Switch Manager communicating with a Switch EEPROM/SDK of the GM Firmware GreenMachine Carrier (GMC)

Figure 7:
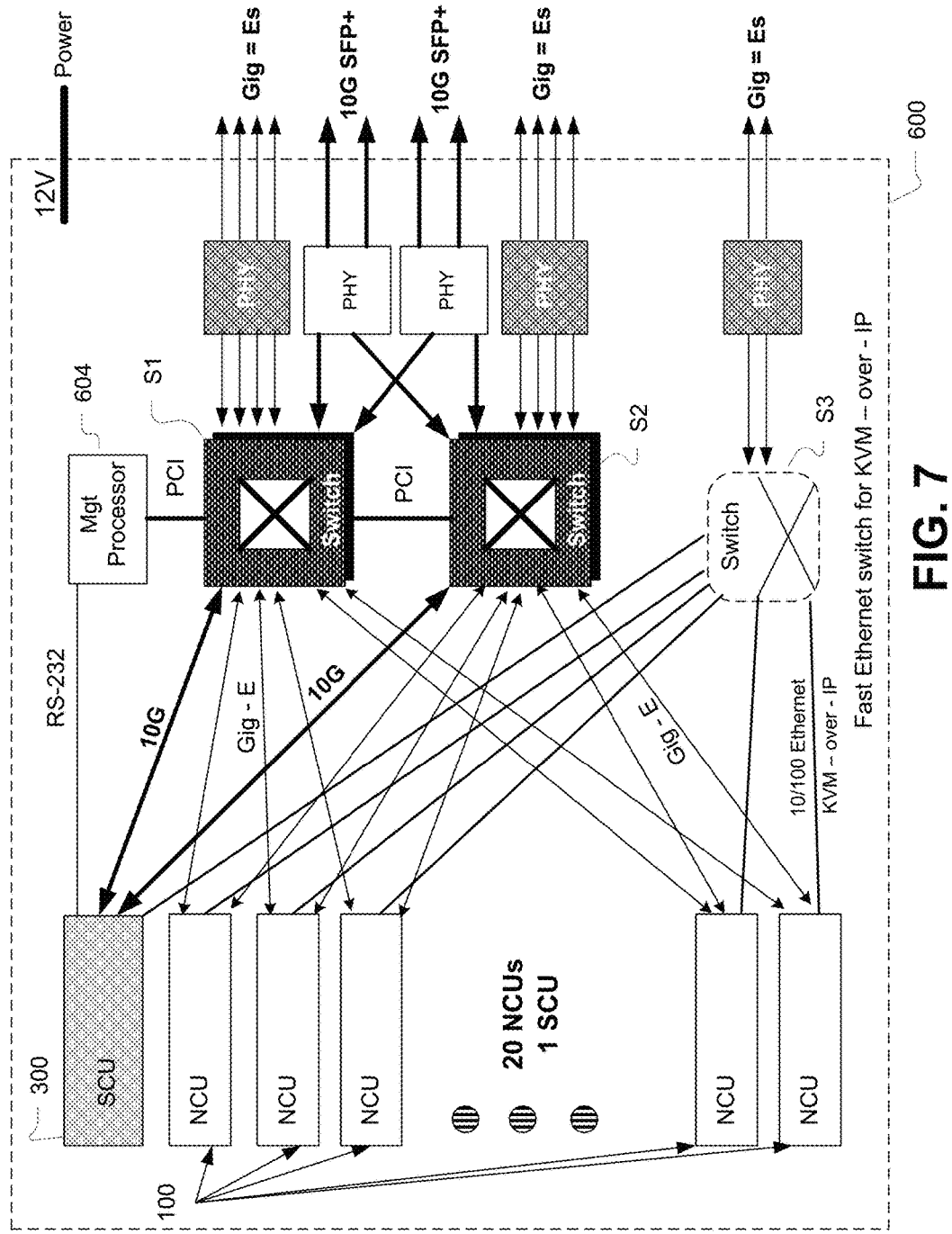
FIG. 7 is block diagram illustrating a GreenMachine Carrier board (GMC) in accordance with an embodiment of the present invention.

NCUs 100 and the SCU 300 physically plug into slots, containing electrical connections, on the GMC 600. Each slot provides power, management controls, system connectivity between the SCU 300 and the NCUs 100, and an external network connection to the user infrastructure. As illustrated in FIG. 7, a 3-switch implementation includes two high speed switch fabrics S1, S2 for system connectivity with the plurality of NCUs 100 and the SCU 300, and a switch fabric S3 for a service processor network. The three switch fabrics S1, S2, S3 provide further connectivity with Gig-Es (Gigabit Ethernet, sometimes known as 1000 Base-T) and 10 g Ethernet through physical layers (PHY). The physical layers provide an interface between the switch fabrics S1, S2, and S3 and the high-speed network connections.

For enterprise robustness, a management processor 604 controls the GMC switch fabrics S1, S2, S3. The management processor 604 runs its own firmware, and can configure the QoS, ACL, and other fabric policies. The SCU system switch management interface on the SCU 300, is connected to the GMC switch management processor 604.

System switch fabrics management interfaces may be implemented either with simple RS232 or network interface (e.g. Ethernet), or I/O bus interface (e.g. PCI, PCIe), with any of these interfaces connecting to the management processor 604. The SCU management bus, connecting to the I/O chipset 306 of the SCU 300, is operating in an IPMB multi-master mode connecting to the NCU service processors 110.

Therefore, GreenMachine 10 provides built-in high bandwidth, redundant interconnections for nodes of a multi-node computer in a single desktop/server sized enclosure. Unlike standard multi-node computers which require additional external cabling and switches to interconnect their nodes in a network, GreenMachine 10 integrates the dual-redundant switch fabric S1, S2 on the GMC 600 inside the enclosure. Each GreenMachine 10 also contains the high speed external uplink ports (e.g. Gig-Es and 10G SFP+) for connecting directly to other GreenMachines 10 and external networks.

GreenMachine 10 provides remote client access of a multi-node computer in a single desktop/server enclosure. Each node of a traditional multi-node computer contains its own keyboard, mouse, and video ports. These are either connected to individual external devices, or aggregated via external switches. GreenMachine 10 uniquely integrates remote management technologies typically found only in high end servers and blade systems. Each NCU 100 contains a KVM-over-IP microcontroller connected to a dedicated switch fabric S3, also internal to the GreenMachine 10. The microcontroller compresses video and USB, allowing devices such as desktops, laptops, or thin clients to access and interact with NCUs 100 as if they were local. This design also allows a single set of monitor, keyboard, and peripherals connected to the GM to access all NCUs 100.

Green Machine Layout

Figure 8A:
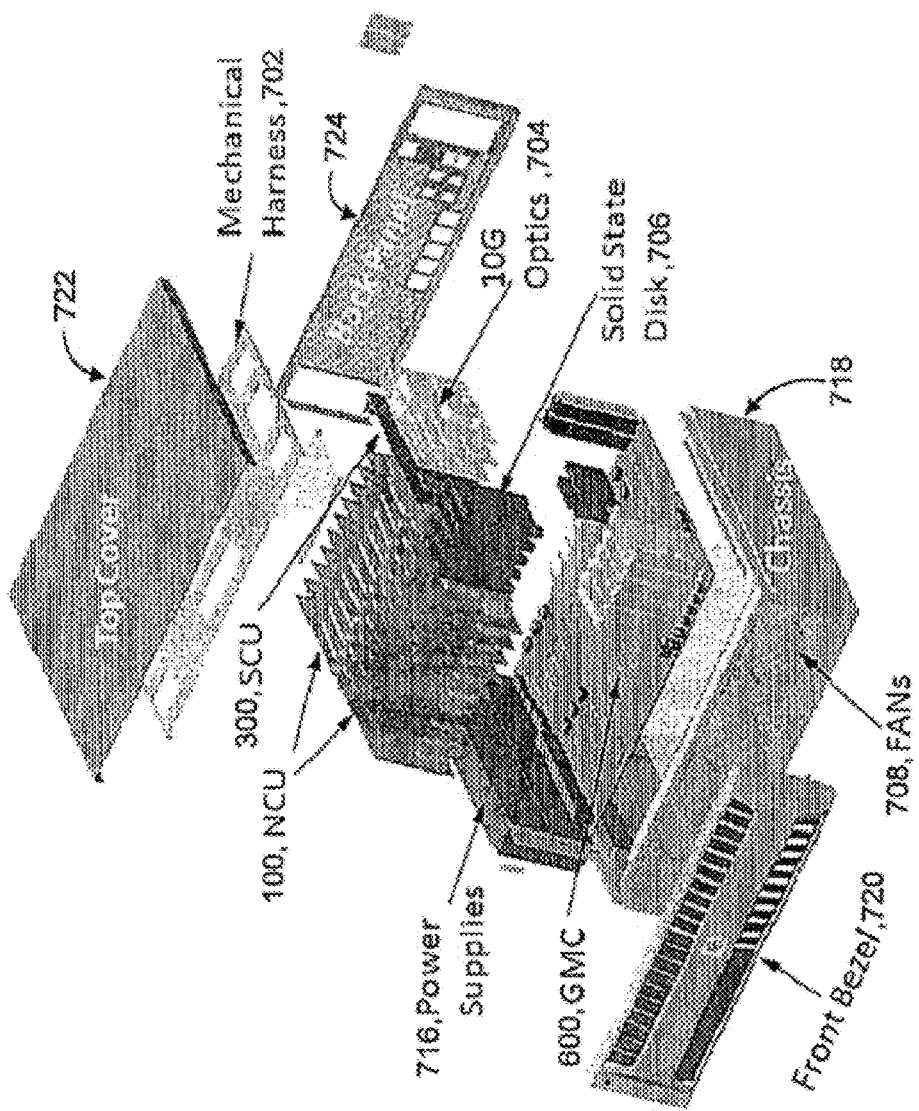
FIG. 8A is a 3D exploded view of a 20-NCU GreenMachine implementation, in accordance with an embodiment of the present invention.

The unique advantages of the GreenMachine 10 architecture (e.g. unprecedented power, space, and computational efficiency) are the result of High Density Multi-Computer System packaging. FIG. 8A illustrates a 20-NCU GreenMachine 10 implementation. The NCUs 100 and SCU 300 appear as cards plugged vertically into the GMC board 600, in a bottom-plane orientation, unlike the boards of conventional multi node computers which typically lay horizontally on the same plane as one another. Unlike blade servers, all GreenMachine cards 100, 300 are contained in a single chassis 718 roughly the size of a standard desktop computer. The NCUs 100 have no individual enclosures. Thus, each card 100 can be spaced only a few centimeters away from adjacent cards 100. In an embodiment of the present invention, each card 100 is approximately 2 centimeters away from adjacent cards 100. A mechanical harness 702 for multiple vertically-oriented CPU cards provides rigidity in the absence of the individual enclosures for each card 100. The cards 100 share cooling, power, networking, and storage subsystems also contained within the same chassis 718. In addition to providing high density packing through this unique approach, the GreenMachine 10 design also provides cable-less connectivity with the NCUs 100 and tool-less service. As discussed below, a single power supply 716 distributes a single voltage to all GreenMachine components, while low-RPM fans 708 within the chassis 718 provide highly efficient cooling, with the fans drawing air through a front bezel 720 fastened to the chassis 718. Finally, a top cover 722 provided over the mechanical harness 702, a back panel 724 providing access to network and I/O connections on the GMC 600, along with the chassis 718, seals in the entire GreenMachine multi-node computer system 10 into a single enclosure.

Efficient Shared Storage

In a further embodiment, GreenMachine provides a dynamically reconfigurable and highly efficient integrated storage facility in a multi-node computer in a single desktop/server sized enclosure. Standard multi-node computers, blade servers, and other existing types of computers support either fixed direct-connected storage per node, or flexibly assigned external storage. GreenMachine allows a dynamic internal storage configuration by using the SCU 300 as an iSCSI storage server for the NCUs 100 in its enclosure, a unique feature for a multi-node system in a single enclosure. As further illustrated in FIG. 8A, The SCU 300 directly connects to an array of disks 706, from which it can create and assign logical volumes (Nano Disks) to NCUs 100. GreenMachine 10 drastically improves the efficiency of physical storage sharing among its NCUs 100 through Copy-On-Write (COW) Nano Disk Clone technology. This technology optimizes disk space usage and access performance when multiple NCUs 100 run similar operating systems and applications. For each Nano Disk the SCU 300 creates, it may optionally allow access from multiple NCUs 100. Each NCU 100 may access the Nano Disk as if it were a dedicated, non-shared resource. For each authorized NCU 100, the SCU 300 creates a virtual storage device consisting of the original Nano Disk and a much smaller writable volume. When an NCU 100 writes data, the SCU 300 redirects the changed data blocks to its writable volume. When an NCU 100 reads data, the SCU 300 provides the data from a combination of the original Nano Disk and writable volumes, as needed. In addition, the SCU 300 employs algorithms optimized for the characteristics of solid state disks 706.

Single-Source Power Distribution

Figure 8B:
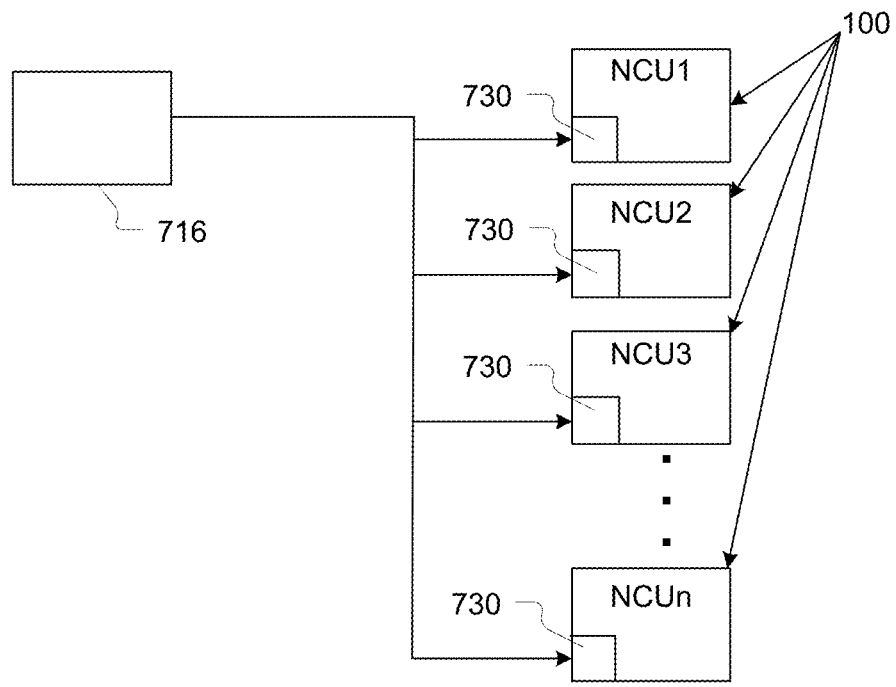
FIG. 8B is a block diagram illustrating a prior art power supply distribution implementation, in accordance with an embodiment of the present invention.

The above described advantages are further improved through an efficient, shared power distribution scheme for a multi-node computer 10 in a single desktop/server enclosure. The GreenMachine multi-node computer 10 achieves superior power efficiency not feasible in other system designs by reducing the number of power supplies and AC-DC conversions, and optimizing the length of power circuitry throughout a system. A single (or two for redundancy) power supply per enclosure supplies a single system voltage to all NCUs 100, the SCU 300 and components of the GMC 600. This uniform voltage then undergoes power conversion at each individual point of load. As illustrated in FIG. 8B, a single power supply 716 supplies a single system voltage to each NCU 100, where a DC-DC converter 730 converts the single voltage at the point of load for each NCU 100.

Figure 8C:
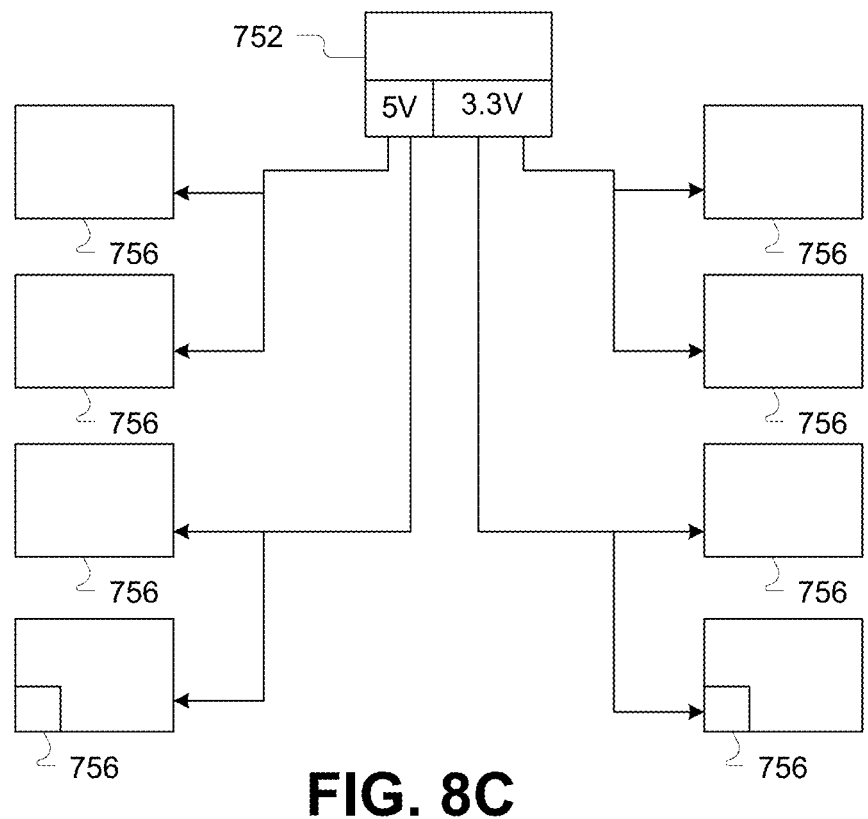
FIG. 8C is a block diagram illustrating a single voltage source distribution implementation in accordance with an embodiment of the present invention.

FIG. 8C illustrates a conventional, prior art, system design using a power supply distributing multiple voltage levels to system components. Using a traditional ATX form factor power supply 752 with a plurality of system voltages 754 (e.g. 3.3V and 5V rails) provided to system components 756, requires a resultant, necessary limitation on the number of loads served by each rail of the power supply 752, varying according to the power rating for each rail 754. In other words, multiple ATX power supplies 752, with the resultant increase in power consumption, would be required to provide power to a 20-NCU 100 GreenMachine 10, rather than the single power supply of the present invention, as illustrated in FIG. 8B.

GreenMachine Power Efficiencies

GreenMachine 10 further reduces power wastage by providing standby power to components only when necessary. This standby power scheme is enabled by the management subsystem 604 which includes power FETs operated by a microcontroller. GreenMachine 10 also eliminates miscellaneous power devices such as CMOS batteries, by using microcontrollers to synchronize the real time clocks on each NCU 100, rather than providing a real time clock back-up battery for each NCU 100.

GreenMachine further provides advanced power management for a multi-node computer 10 in a single desktop/server enclosure. GreenMachine 10 compacts the power management capabilities previously found only in high end blade systems into a form that desktop/workstation sized multi-node systems can effectively benefit from. It accomplishes this by incorporating a compact SCU 300 board into the GreenMachine 10, which can intelligently orchestrate power sharing, power sequencing, and optimization.

Ultra-Efficient Cooling

Figure 8D:
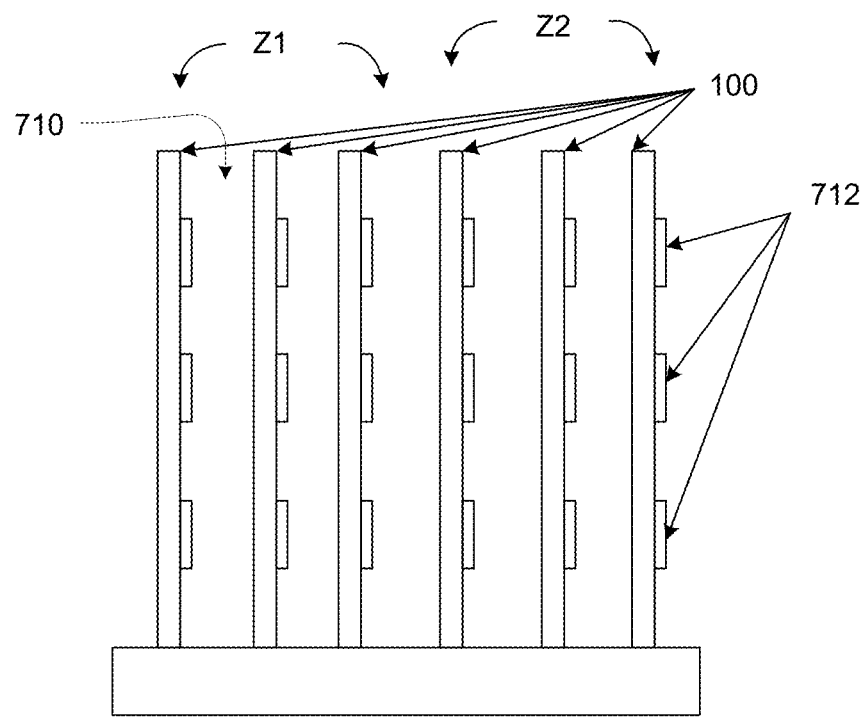
FIGS. 8D and 8E are a side-view and top-view, respectively, illustrating the placement of NanoCompute Units to create cooling channels between the NanoCompute Units in accordance with an embodiment of the present invention.
Figure 8E:
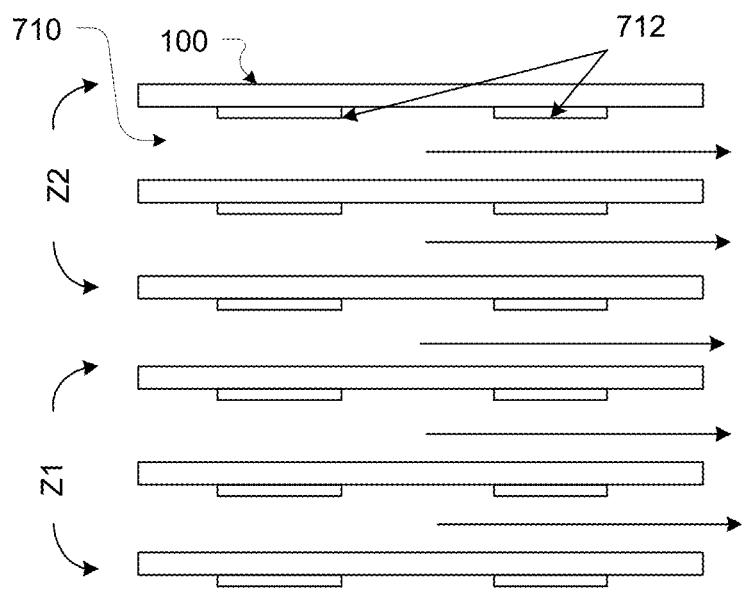

In a further embodiment, GreenMachine 10 provides an ultra efficient cooling design for a multi-node computer in a single desktop/server sized enclosure. The physical design of an implementation of the GreenMachine 10 as illustrated in FIGS. 8A, 8D, and 8E allows for a minimal number of low-cost, quiet, low-RPM fans 708 to adequately cool all the cards 100 in an enclosure. The tightly packed NCUs 100 form rows of thin, natural air channels 710 without the need for additional ducting. The air channels 710 are 2 centimeters wide, which represents the spacing between NCUs 100. The cooling channels 710 are formed between the rows of NCUs 100 to provide effective layers of air flowing past the NCUs 100 through the cooling channels 710. Further, as illustrated in FIG. 8A, the NCUs 100 are flipped in orientation between the two rows of cards 100 so that the NCUs 100 of the first row do not easily conduct heat to the following row of NCUs 100. Low profile heat sinks 712, illustrated in FIGS. 8D and 8E, in each channel 710 allow the entire volume of air flow to effectively draw heat away from critical components, as opposed to other mechanical designs which require either more airflow, colder airflow, additional materials used in ducting or heat piping, or all of the above. The cooling channels 710 with the low profile heat sinks 712 provide a highly efficient cooling environment, as an optimal amount of air molecules are able to efficiently contact the heat sink surfaces 712.

A micro-controller on the GMC 600 further optimizes the efficiency of GreenMachine's 10 cooling. It reads temperature sensors 714 located in every cooling channel 710, and can control multiple fans 708 each serving independent channels 710, or zones Z1, Z2 of channels 710. The sensors 714 may be located on the NCUs 100 themselves, or near each NCU 100 slot on the GMC 600. For the highest accuracy, the temperature sensors 714 are placed on the NCUs 100 directly.

This ultra-efficient cooling design differs from standard multi-node, desktop, server, or workstation cooling designs which do not feature a single cooling subsystem controlling multiple independent cooling/zones and fans 714. By dividing the internal area into zones Z1, Z2, the micro-controller may efficiently control the cooling of the GreenMachine 10 by increasing the RPM of individual fans 708 to meet the cooling requirements of a particular zone Z1, Z2, based on the temperature sensors 714 in the cooling channels 710 of the particular zone Z1, Z2, while lowering the RPM of other fans 708 as the cooling requirements of their assigned zones Z1, Z2 allow it.

Thermal Control

In a further embodiment, GreenMachine 10 provides an ultra efficient cooling design for a multi-node computer in a single desktop/server sized enclosure using an active thermal control technique. Well-known computer system thermal control techniques involve passive functions, such as thermally-conductive packaging, physical openings in the enclosure to promote air flow, forced air flow with fans, and fins and heat sinks used to enlarge surface areas for air cooling. With the exception of limited clocking and, occasionally, fan control, these techniques are essentially passive in nature and are not adjustable to meet real-time needs.

Using current technology, an enclosure of a computer system typically is designed with a maximum heat dissipation capability in mind, which strongly influences the components and compute-capability supported by the enclosure. One general approach to thermal planning and control is to identify a maximum operating temperature for the enclosure, and then limit the components in the enclosure to the specific configuration that will generate the maximum operating temperature, and also require that all components in the enclosure have the ability to operate at that maximum temperature. As a result, peak theoretical thermal drain is often a key limiting factor in overall system capability and design.

According to some embodiments, GreenMachine 10 provides an ultra efficient cooling design for a multi-node computer using extensive instrumentation and granular thermal control of the computer system. This constitutes a fundamentally different approach to thermal planning and control that enables maximum compute-capability for a given footprint, and supports the use of a broader range of components than would otherwise be possible using traditional thermal planning and control schemes.

In addition to utilizing the standard thermal control techniques enumerated above (e.g., thermally-conductive packaging, physical openings in the enclosure to promote air flow, forced air flow with fans, fins and heat sinks, adjusting CPU clock-rate, and fan control), embodiments of the present invention include additional thermal management technology. For example, components may be strategically arranged within an enclosure to manipulate where air flows and where air contacts the blades. Redundant fans may be used to better cool certain components or to adjust where air flows and where air contacts the blades, as necessary.

According to some embodiments, a multi-parameter approach to temperature monitoring is employed. Temperatures are directly measured using temperature measurement sensors located on NCUs, control units, the main board, I/O units, switch units, and throughout the enclosure. The main board and the enclosure may include multiple temperature measurement sensors for redundancy and to measure temperature differences across multiple zones. Temperature may be indirectly monitored using a logged measurements of voltage throughput and voltage spikes and/or drops. Fan speed and airflow over time may also be considered when indirectly monitoring temperature.

According to some embodiments, detailed temperature profiles are created and may include spatial, temporal, and workload-based parameters. A temperature profile may be created for specific sections or zones of the overall enclosure, as well as for individual components. The duration and/or timing of application usage may be considered to create a thermal profile based on workload requirements for specific applications. Other factors considered when creating a detailed temperature profile may include time-of-day (TOD) operation and weather-related data, which is particularly critical for outdoor or remote locations. Other information included in a detailed temperature profile may be based on rated specification information relating to a components' thermal requirements, both operational and standby. The temperature profile data may be used to establish a thermal profile over time.

Extensive temperature monitoring and temperature profile creation enhances the performance and operation of the GreenMachine 10 in several ways. For example, real-time condition-based control of the thermal environment based on the temperature monitoring and temperature profiles may be used to allocate specific components and resources to specific applications, thereby matching the application's temperature profile requirements with the temperature profiles of individual components and their location in the overall enclosure, and enabling the CPU clock-rate and other load-adjustable components to be adjusted based on thermal conditions.

The temperature monitoring and temperature profile creation also support lifetime thermal control for avoiding thermal excursions, and ensuring that both the components and the overall enclosure are kept within the appropriate ranges for the appropriate amount of time, thus increasing lifetime and maximizing mean time between failures (MTBF). For persistent loads, the control system may utilize standard mechanisms for long-term de-clocking of individual processors and other load-adjustable components. The use of temperature monitoring and temperature profile creation reduces the amount of in-field maintenance required for the system because the thermal wear and stress on the system is mitigated.

Thermal history is used to determine which components are to be taken offline or replaced, estimate the likelihood of future failure, and extend components' lifetimes by adjusting future load. Furthermore, power usage may be reduced by operating only the components needed at the time, and by adjusting cooling on the fly to avoid over-use of cooling power when not needed.

According to some embodiments, extended temperature profiles may be used with other enclosures (e.g., other green machines) located in horizontal or vertical proximity within a rack or larger enclosure.

The use of temperature monitoring and temperature profiles enables GreenMachine 10 to support the inclusion and use of compute, storage and I/O resources and capabilities beyond what would otherwise be supported in an enclosure. This maximizes performance of the system and is accomplished through the active power management of the system as described herein. In the absence of active power management, the capacity of the enclosure and cooling system will be exceeded when all components are fully active.

Temperature monitoring and temperature profile creation enables the use of some components that otherwise would not be compatible with the enclosure, due to component thermal limits, for example. Different temperature profiles may be created within the same enclosure and specific components may be disposed in locations that meet the requirements for the component. Temperature monitoring and temperature profile creation also enables partial shutdown of the system, or a particular section of the enclosure, while continuing normal operation elsewhere in the enclosure. Immediate maintenance is not required in the case of partial shutdown, and other components are not disrupted.

According to some embodiments, additional thermal controls are implemented to mitigate the effects of heat within the enclosure. For example, fans can be activated, and their speed controlled according to real-time thermal requirements. According to some embodiments the fans are controlled by a low-power microcontroller to avoid CPU overhead, and the primary control unit does not use the CPUs in nano-compute units. When housekeeping functions are performed by the control unit and/or distributed microcontrollers, the NCU CPUs are able to focus on executing applications and additional CPU drain due to housekeeping is limited.

Many components draw high power momentarily upon boot-up and initiation, and draw less power when in operation. A boot sequence may be used to control timing and allocation of component initialization/activation to avoid thermal excursions. Many components can be taken offline or brought online on the fly, thus eliminating the need for constant on-state power drain.

The NCUs 100 also include thermal control sensors and may be configured to shut down individually if their temperature exceeds a specified temperature threshold. As an additional safety factor, the GreenMachine 10 can shut down a particular component if a part of the overall enclosure becomes overheated, without shutting down the entire system. Thermal controls and shutdown are used at the main board level and the power supply level to prevent fire or severe damage to the system.

Latency and Jitter Mitigation

Standard multi-node computer systems typically assign most housekeeping tasks to the CPU that is responsible for performing application processes, thus contributing directly to the problem of latency and jitter. According to some embodiments, GreenMachine 10 executes applications independent of housekeeping chores, even when housekeeping requirements increase over time. Separate control units are utilized to handle different tasks. Primary housekeeping chores, including thermal management, are performed by a separate control unit, rather than the NCU CPUs. Other housekeeping chores are performed by individual microcontrollers, such as the fan microcontrollers on the backplane, for example. The I/O controller also handles some communication functions that would ordinarily be handled by the application CPU. In addition, security tasks may also be handled by a separate security unit.

Offloading housekeeping chores enables an application to run on a dedicated CPU. There is minimum interruption and minimum sharing of cycles for management and housekeeping tasks, thereby significantly reducing the need for time-slicing and increasing system performance. Because communication pathways within an enclosure may potentially contribute to latency and jitter, GreenMachine 10 includes a sufficiently rapid network and includes two paths to memory and two paths to each NCU within the enclosure.

According to some embodiments, the NCUs 100 include onboard memory and may access shared memory, where the onboard memory is capable of storing an instance of an operating system (e.g., Windows, Unix, Linux, OS X, etc.). This minimizes boot time and the time required to make compute resources available for other tasks. When an application is ready for initialization on an NCU, the control system can load either a base operating system to the NCU, or an operating system image pre-configured with certain configuration settings (e.g., what resources are available, what resources can be allocated for the particular application, etc.). A base operating system typically must perform dozens or hundreds of housekeeping checks before the operating system is ready to run an application. By loading a pre-configured image, housekeeping tasks may be significantly reduced or eliminated.

Virtualization

According to some embodiments, GreenMachine 10 uses a granular approach to both hardware and software resource allocation to reduce latency and jitter, allocate resources to specific applications, reduce CPU and system costs, reduce power consumption and cooling, improve upgrade paths, and improve reliability (e.g., MTBF). Traditional approaches to virtualization often use a processor that is shared among multiple applications and multiple tenants by time-slicing the processor's resources. This allows a single processor to host multiple applications, but drawbacks include greater latency and jitter, and extra overhead and housekeeping required by the virtualization system. Furthermore, resources available to the various applications are largely uniform in scope, which limits the ability to balance application needs and performance. As a result, systems running virtualization environments tend toward very powerful processors, exacerbating power draw, cooling needs, and reducing MTBF. In contrast, embodiments of the present invention allow for precise allocation of resources at a granular level, reducing overhead, increasing performance, and improving MTBF.

According to some embodiments, the NCUs 100 each include a dedicated processor and onboard memory, and each NCU is dedicated to a single application. Minimal housekeeping is required and resources do not need to be shared with other applications. The control system can assign a specific type of processor (or multiple processors) to a single application. Each NCU also includes enough onboard memory to house an operating system, load resource data, and handle basic functions. Additional shared memory is allocated as needed. Flexible allocation of resources enables the NCUs 100 to support specialized applications. For example, memory can be assigned as needed for applications that are memory-intensive, or additional I/O can be assigned for applications that are I/O intensive. In this way, the resources available to a particular application can be more individualized and more granular than in standard approaches to virtualization.

Detailed analysis and control of available resources are necessary to match an application with the appropriate resources for optimal performance. This is accomplished using appropriate controls and relevant information gathered, such as performance data and thermal profiles. In this way, an optimal balance between raw processing power, storage, memory, internal and external communication, individual memory, etc., can be achieved to maximize performance for each application and enhance overall system performance.

The precise and granular virtualization techniques provided by GreenMachine 10 enable the use of price-favorable commodity components and multiple NCU units within a small footprint. Modular components may include different processors, memory units, I/O, security, specialty units, and long-life embedded components, for example. These factors help reduce overall system costs, allow for easier and more economical upgrades, and provide improved application performance over time without significant system expense.

Noise Reduction

In a further embodiment, GreenMachine 10 provides noise reduction for a multi-node computer in a single desktop/server sized enclosure. Standard multi-node computers, servers, and blade systems are typically meant for datacenters and therefore their designs make little effort to reduce noise. Although the high density of NCUs 100 suggests an inevitable increase in noise, the GreenMachine 10 design features characteristics that uniquely reduce noise to that of a single quiet desktop. In a conservative simulation with an ambient temperature of 25 degrees C., the noise level was less than 40 dB. In a further simulation with an ambient temperature of 40 degrees C., the noise level increased to around 55 dB. The thin air channels 710 not only optimize efficiency but also reduce air turbulence. Independent zones Z1, Z2 allow the cooling system to increase the speed of individual fans 708 only as needed. Finally, the shared power supplies 716 result in a reduction in the overall number of fans 708 required. Overall, these attributes allow GreenMachine 10 to be used in noise sensitive environments that other computer architectures are not suitable for.

GreenMachine Cluster Computing

In a further embodiment, GreenMachine 10 provides high performance cluster processing capabilities of a multi-node computer in a single desktop/server sized enclosure. Unlike other systems, including multi-node computers, of comparable physical size, power consumption, or cost, the GreenMachine 10 can be used as a high performance computational cluster contained within a single compact enclosure. It accomplishes this through the design of its modular NanoCompute Units 100, integrated high bandwidth network fabric, and clustered software technology. As discussed above, each NCU 100 optionally contains: an embedded GPU 112 for graphics, video and floating point offload; and an embedded network processor 114 for communication and storage network offload. These components maximize the efficiency of each NCU 100, but are also ideal for high performance cluster computing utilizing a plurality of NCUs 100. Each NCU 100 has optionally an embedded GPU 112. The embedded GPUs 112 provide low level supports for floating offload either via CUDA or OpenCL.

Further GreenMachine Implementations:

The GreenMachine design can be applied in additional variations to further maximize its architectural advantages. FIGS. 9-12 illustrate several possible variations to further maximize the above advantages.

Figure 9:
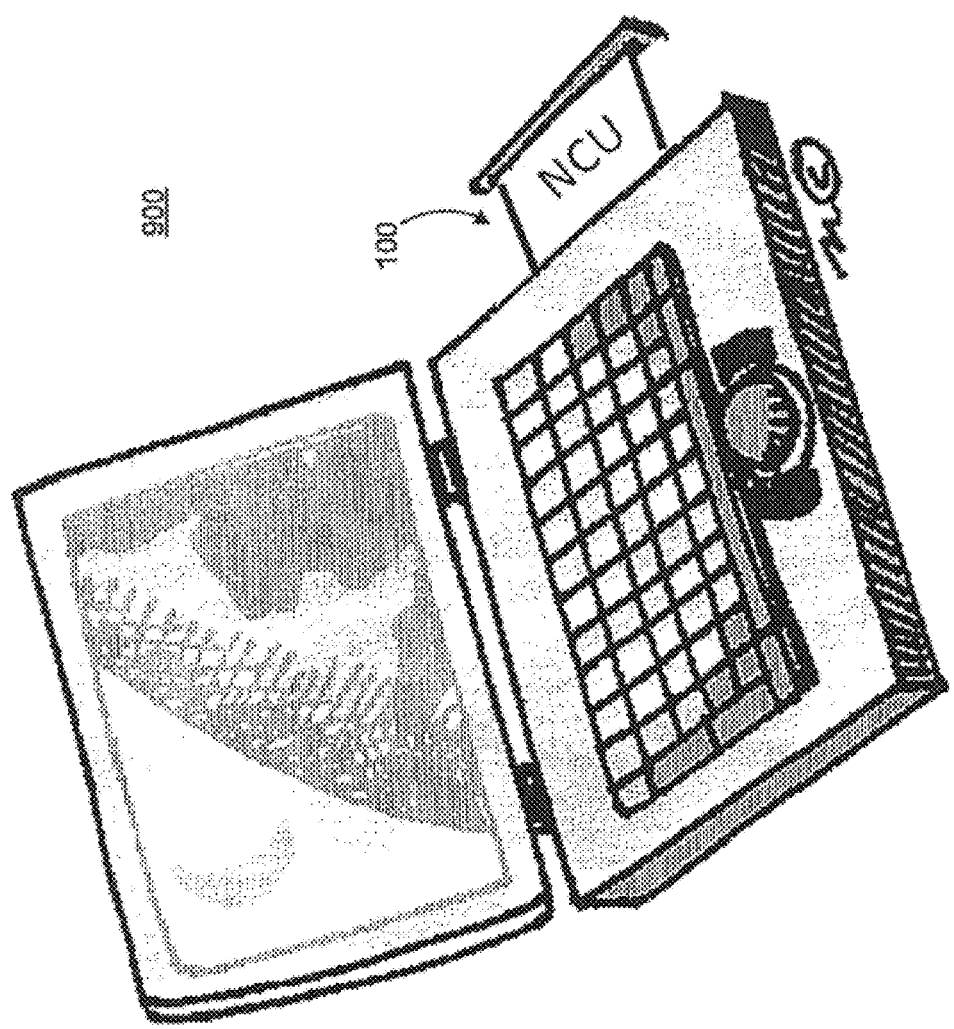
FIG. 9 illustrates a laptop computer incorporating an upgradeable NCU in accordance with an embodiment of the present invention.

As illustrated in FIG. 9, the NCU 100 may be implemented as a modular, upgradable processing subsystem for a green, re-useable laptop computer 900. Due to its small size, an individual NCU 100 may be repackaged in a notebook computer enclosure 900. This packaging allows the major components of a notebook computer 900 to be upgraded while reusing the casing, screen, keyboard, and ports.

Figure 10:
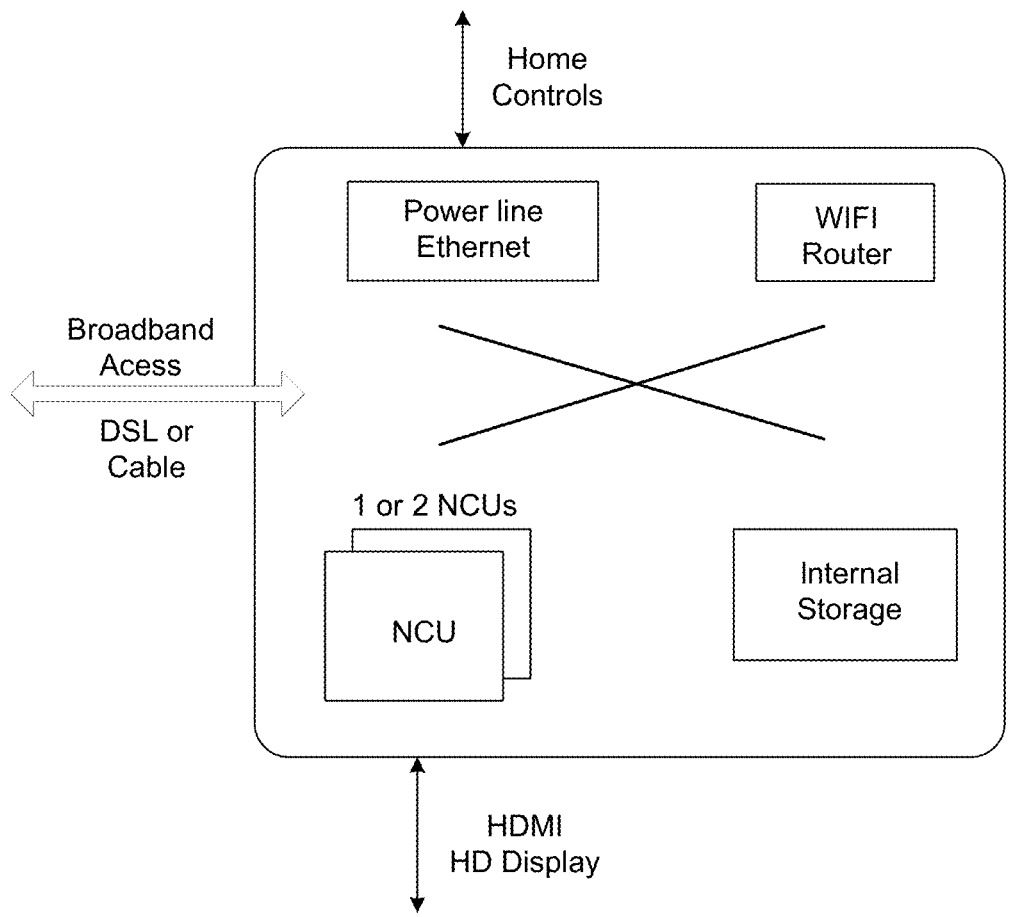
FIG. 10 illustrates a scaled down version of GreenMachine as a Home Gateway Appliance in accordance with an embodiment of the present invention.

As illustrated in FIG. 10, NCUs 100 may also be repackaged in other configurations for specific applications, such as a home gateway appliance. This allows the benefits listed above to be even more finely optimized for specific workloads and purposes.

Figure 11:
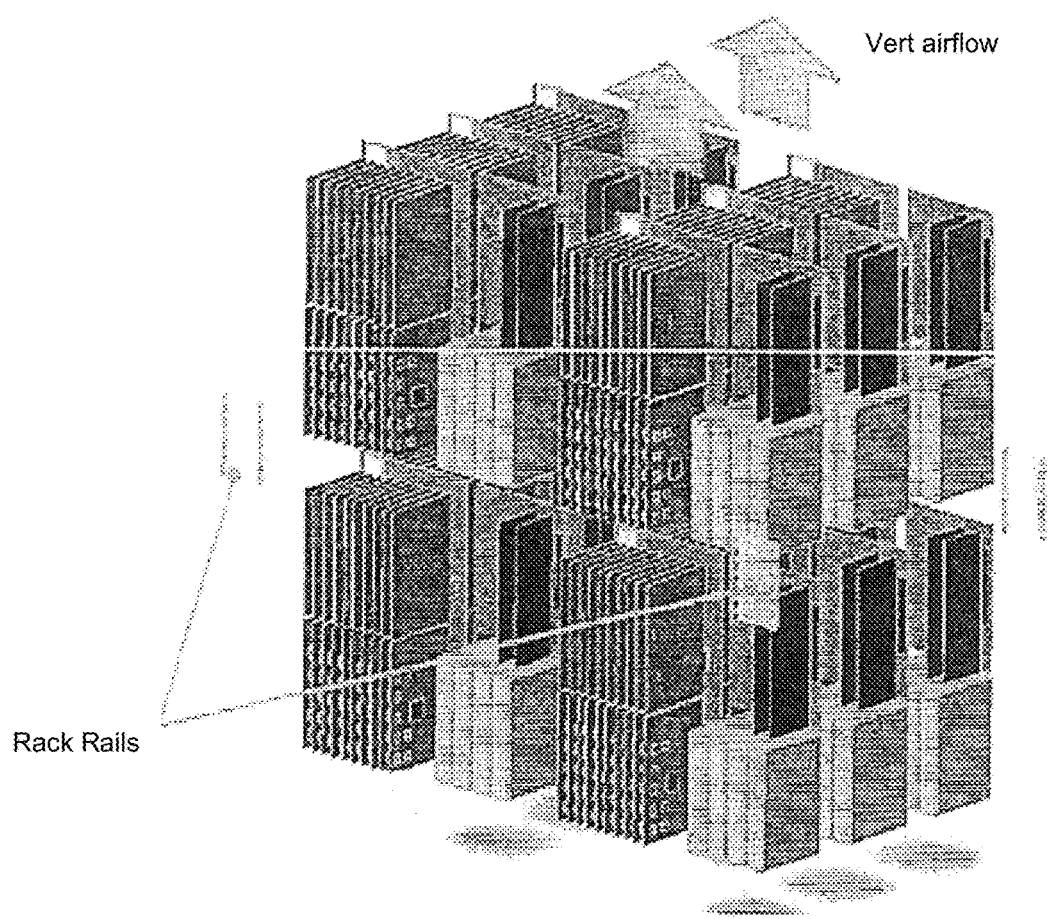
FIG. 11 illustrates a 3D illustration of rack-frame packaging of twelve GreenMachines in accordance with an embodiment of the present invention.

As illustrated in FIG. 11, rack-frame packaging architecture for multiple GreenMachines in a datacenter infrastructure may be implemented. Six GreenMachines may be packaged in a 3×2 row arrangement with power distribution on the side of the rack and with a bottom-to-top air cooling design. FIG. 11 illustrates twelve GMs configured for a standard 31.5 inch rack, utilizing the 3×2 row arrangement, with each level containing six GreenMachines. The open chassis structure of the rack is not shown.

The low energy requirements of GreenMachine 10 enable additional configurations where GreenMachines 10 are powered by batteries, such as in various consumer electronics devices. In addition to low power dissipation due to component selection and power management, the GreenMachine power distribution design enables a system design outside of laptop computers to be powered via battery, leveraging the enormous investments that have been going into battery research for electric cars and other applications. A battery pack may be designed either to fit into the same space as the GreenMachine power supply modules or an external attached battery station similar to the laptop. A battery powered GreenMachine would be able to take advantage of solar/alternative energy charging, optimization of peak energy usage, increased fault tolerance, and portability.

PCIe-Based Memory Fabric:

In a further embodiment, GreenMachine 10 may be implemented with PCIe-based Memory fabric for dynamic multi-node computer system. Replacing the Ethernet network fabric with a PCIe memory fabric is a unique feature of a computer system in a single enclosure. It allows much higher bandwidth and low latency of all types of communication between NCUs 100 and devices. It also allows for additional resource sharing, power savings, and cost optimization.

As illustrated in FIGS. 12A-12D, a memory fabric 1200 integrated GreenMachine comprises: an integrated SCU 300 for system management and controls; embedded fabric processors 1202 for in-stream processing (e.g. memory copy, encryption, automatic data migration); extended memory support via fabric processors 1202 for NCUs 100; atomic complex (AC) lock facility 1204 for synchronization; auto data migration for hierarchical and heterogeneous memory infrastructure; TCP/IP memory-based facility 1206 for inter-node communication (implemented by a software driver used by each NCU 100, such that the TCP/IP memory-based facility 1206 may make use of the memory fabric); virtual I/O 1208 implementation for physical I/O device sharing (e.g. VNICs, VHBAs . . . ); and NCU native I/O console 1210 traffic (Video, USB, Audio) for remote thin clients. The PCIe memory fabric 1200 could be used to enable the following features unique to any type of commodity computer system: clock and power distribution design for aggregating multiple hardware cache coherence NCUs 100 into a Dynamic Multi-Processor node (DMP), and a reflective memory mechanism for aggregating multiple NCUs 100 into a DMP node.

Figure 12A:
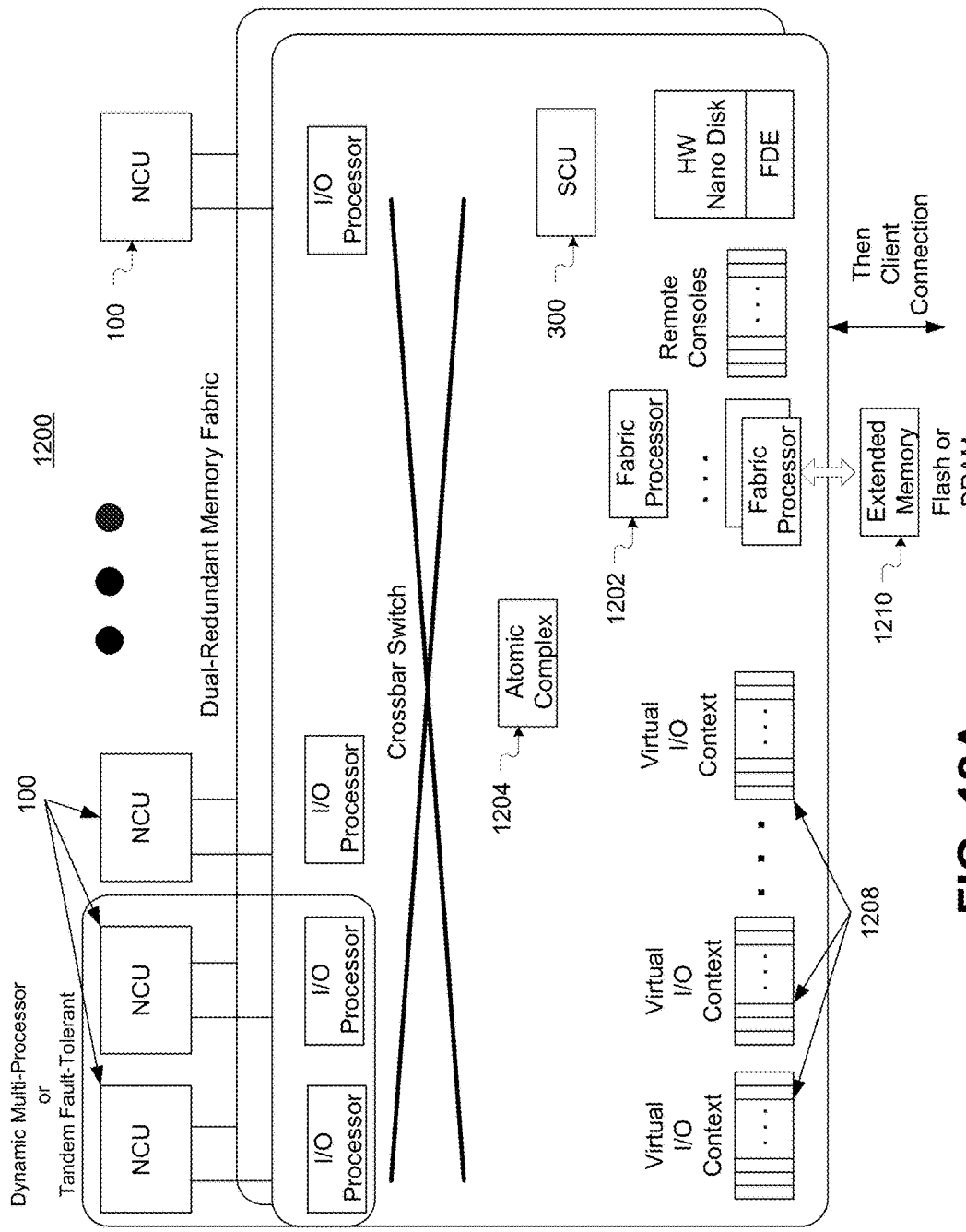
FIGS. 12A-12D illustrate a GreenMachine Memory-based Fabric Architecture implementation in accordance with an embodiment of the present invention.
Figure 12B:
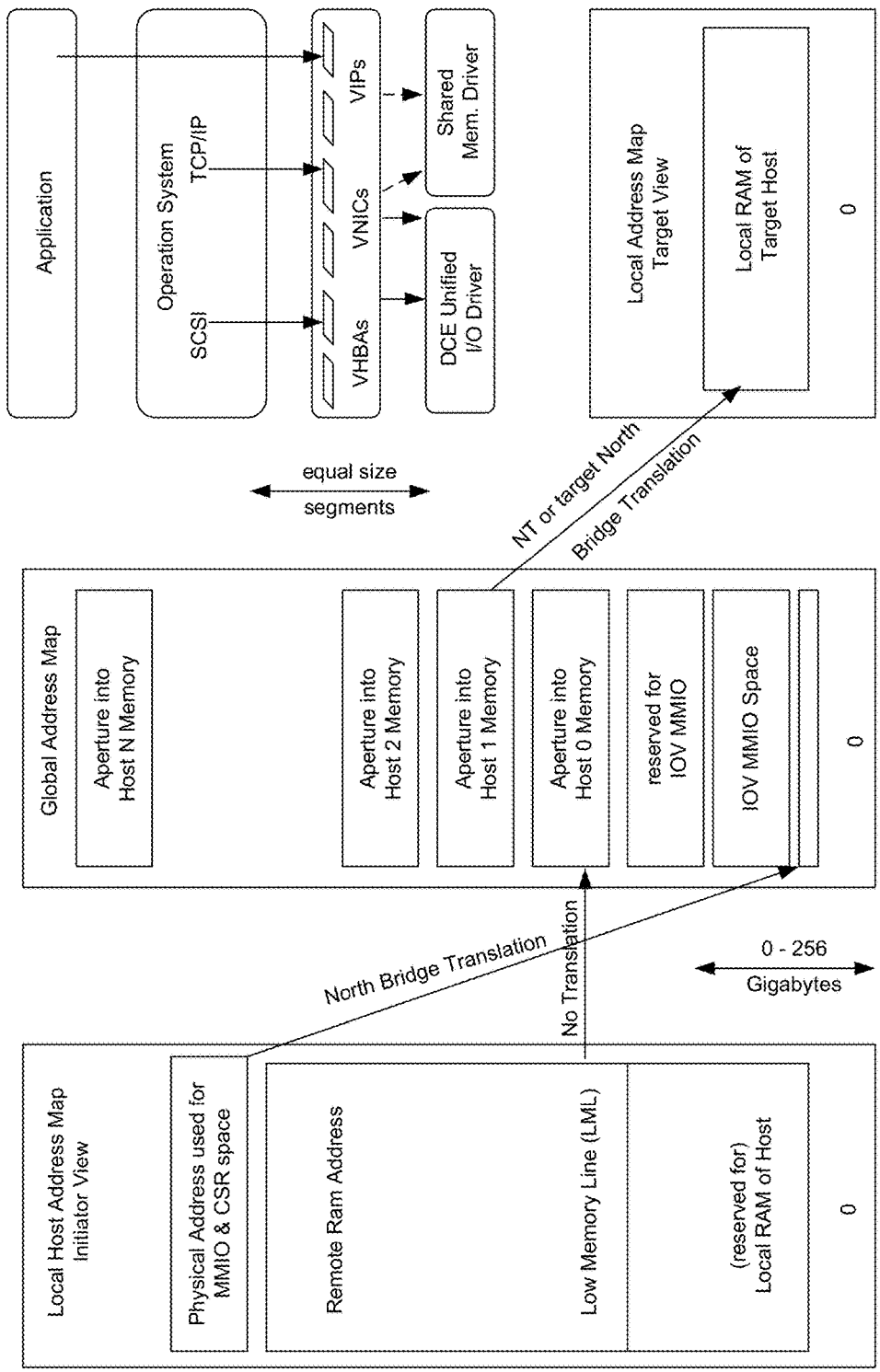
Figure 12C:
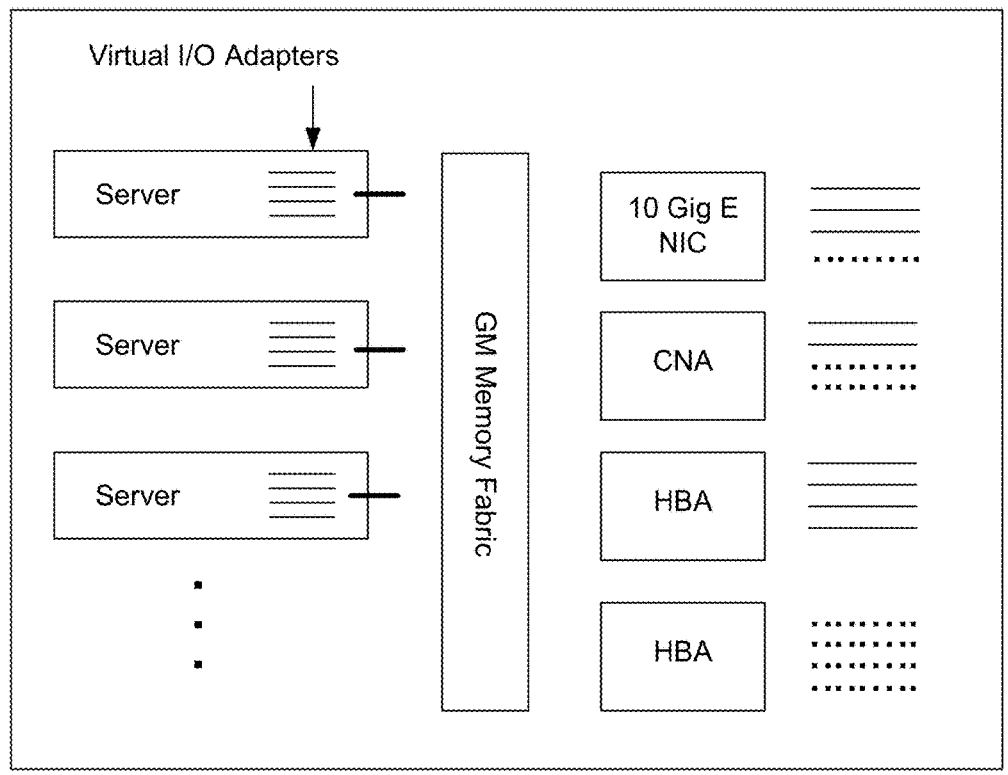
Figure 12D:
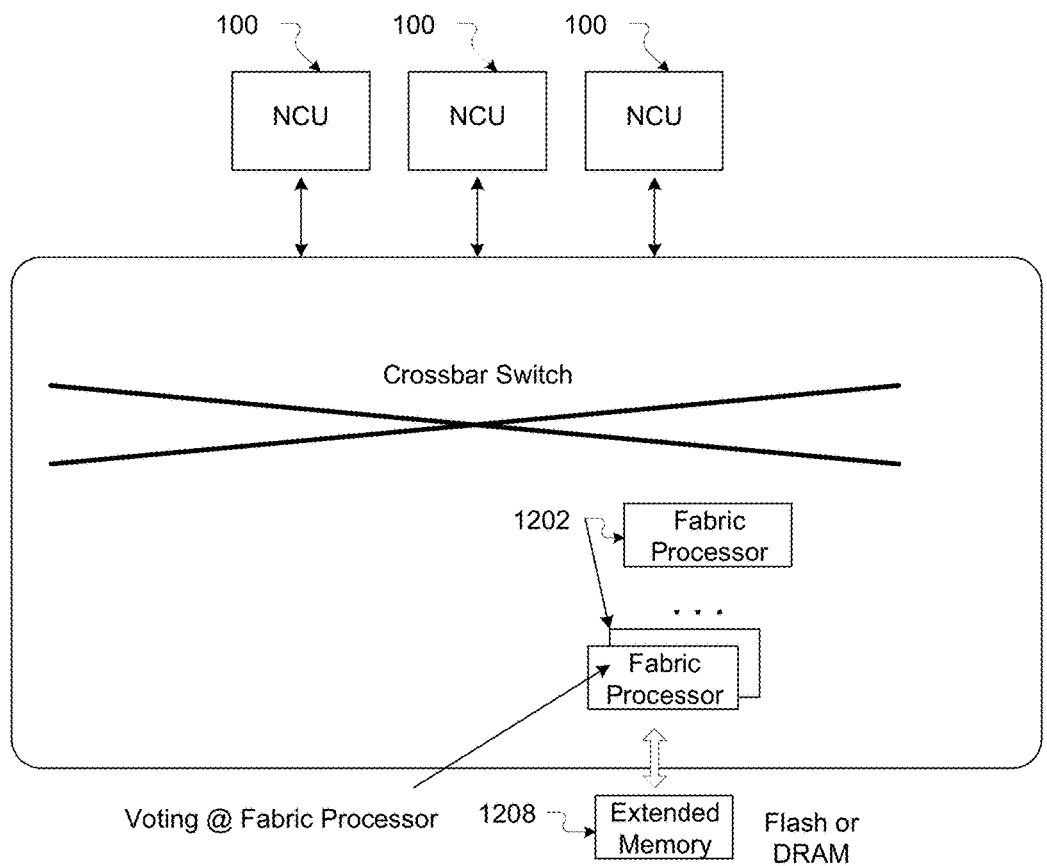

Further, as illustrated in FIG. 12D, clock synchronization for lock-step dual NCU Tandem Fault Tolerance node configuration (TFT), and Triple NCU Redundant Fault Tolerance node configuration may be implemented. The cost-savings and efficiency inherent in the use of NCUs 100 is leveraged into the NCU Redundant Fault Tolerance configurations, wherein two NCUs 100 (for dual) or three NCUs 100 (for triple) are used to implement the Redundant Fault Tolerance. Through voting by the fabric processors 1202 after the two or three NCUs 100 have processed a result, processing faults or errors may be identified and discarded, with only the correct result sent on to memory 1208.

In a further embodiment, GreenMachine 10 may incorporate virtualized local storage for dynamic, distributed storage support in a multi-node computer system. By using a PCIe memory fabric 1200 in which PCI devices (real or virtual) can be connected to multiple NCUs 100, the use of centralized, shared, virtualized, and networked storage (as described above) can be extended to provide virtualized local disks. This has the advantage of greater operating system support, higher performance, and reduced complexity. It also enables the unique support and use of virtualized and shared storage, such as heterogeneous storage hierarchies including cache, flash memories, and standard HDDs; and external storage (iSCSI, FC). The GreenMachine implementation features: full isolation; secure client access; and auto data migration by moving data between storage levels to optimize for access latency and performance.

In a further embodiment, GreenMachine may incorporate the use of Hibernation/Checkpoint/Restart technology for system load balancing within the components of a single enclosure. Hibernation, checkpoint, and restart technologies are typically deployed in high end fault tolerant systems, or in high performance computing clusters where individual processing jobs can take days. The GreenMachine architecture allows this technology to become useful within a single self-contained machine for the purpose of dynamic resource allocation supporting multiple workloads without requiring a unique adaptation of the Hibernation/Checkpoint/Restart technology for the GreenMachine multi-node computer system 10. In this implementation, the SCU 300 would detect idle NCUs 100 and checkpoint their state. The workload could be saved or moved to another NCU 100 at a later time. The SCU 300 would also move hardware identities such as MAC addresses, along with the check pointed image. Hardware address relocation could be accomplished either by firmware management or by address virtualization.

In a further embodiment, GreenMachine may be scaled beyond a single enclosure. Such scaling would include: NCC supporting multiple GreenMachines; Error Recovery and Fault Containment; and Domain Partitioning.

What is claimed is:

1. A computer system, comprising:
    a single enclosure;
    a plurality of nodes comprising:
        a processor;
        an onboard memory;
        a real time clock synchronized by a first microcontroller; and
        a coprocessor configured to offload communication functions from the processor;
    a system control unit comprising a field effect transistor powered by a second microcontroller for performing housekeeping tasks; and
    a carrier board comprising a system fabric and a plurality of electrical connections, the electrical connections providing a respective one of the plurality of nodes with power, management controls, system connectivity between the system control unit and the plurality of nodes, and an external network connection to a user infrastructure, wherein the system fabric comprises at least two high-speed switches controlling the system connectivity and providing shared memory access,
    wherein the system control unit and the carrier board provide integrated, shared resources comprising at least one of cooling and power resources for the plurality of nodes, wherein the processor is dedicated to execute instructions of an application, and wherein housekeeping tasks for executing the application are offloaded from the processor to the system control unit and the coprocessor.

2. The computer system of claim 1, wherein the system control unit is configured to load an operating system image on a first node when the application is to be executed by a processor of the first node.

3. The computer system of claim 2, wherein the operating system image comprises a pre-configured operating system image, wherein loading the pre-configured operating system image on the first node reduces the number of housekeeping tasks performed before executing the application.

4. The computer system of claim 3, wherein the pre-configured operating system image is configured to allocate resources to the application.

5. The computer system of claim 1, wherein the housekeeping tasks comprise a thermal management task.

6. The computer system of claim 1, wherein housekeeping tasks are offloaded from the processor to the system control unit and the coprocessor to reduce jitter of the nodes.

7. The computer system of claim 1, wherein the system control unit controls power management, cooling, workload provisioning, and native storage serving of the computer system.

8. The computer system of claim 1, further comprising a plurality of microcontrollers that control a plurality of fans disposed within the single enclosure.

9. The computer system of claim 1, wherein the single enclosure is a notebook computer enclosure.

10. The computer system of claim 1, further comprising a security unit that offloads security tasks from the processor and executes the security tasks to reduce latency of the nodes.

11. The computer system of claim 1, wherein the system fabric is a dual redundant scalable system fabric.

12. The computer system of claim 1, wherein a first node of the plurality of nodes is integrated as a single chip.

13. The computer system of claim 1, wherein the system fabric comprises a third switch for communicating with a service processor network.

14. A computer system, comprising:
    an enclosure, wherein the computer system is provided in a single enclosure;
    a plurality of nodes comprising:
        a processor;
        an onboard memory comprising an instance of an operating system; and
        a real time clock synchronized by a first microcontroller;
    a shared memory accessible to the plurality of nodes;
    a system control unit comprising a field effect transistor; and
    a carrier board comprising a system fabric and a plurality of electrical connections, the electrical connections providing a respective one of the plurality of nodes with power, management controls, system connectivity between the system control unit and the plurality of nodes, and an external network connection to a user infrastructure, wherein the system fabric comprises at least two high-speed switches controlling the system connectivity and providing memory access to the nodes;
    wherein the system control unit and the carrier board provide integrated, shared resources comprising at least one of cooling and power resources for the plurality of nodes, wherein the computer system is provided in a single enclosure, wherein a first node of the plurality of nodes is dedicated to execute instructions of an application, wherein the system control unit allocates shared memory to the first node according to memory requirements of the application, and wherein housekeeping tasks for executing the application are offloaded from the processor to the system control unit.

15. The computer system of claim 14, wherein the first node of the plurality of nodes is dedicated to execute instructions of the application based on a processor type of the first node.

16. The computer system of claim 14, wherein a subset of nodes of the plurality of nodes is dedicated to execute instructions of the application.

17. The computer system of claim 14, wherein the system control unit loads an operating system image on the first node when the application is to be executed by a processor of the first node.

18. A computer system, comprising:
an enclosure, wherein the computer system is provided in a single enclosure;
a plurality of nodes comprising:
a processor;
an onboard memory;
a real time clock synchronized by a first microcontroller; and
a first temperature sensor;
a shared memory accessible to the plurality of nodes;
a system control unit comprising a field effect transistor and a second temperature sensor, wherein housekeeping tasks are offloaded from the processor to the system control unit to execute an application using the processor; and
a carrier board comprising: a third temperature sensor; a system fabric; and a plurality of electrical connections, the electrical connections providing a respective one of the plurality of nodes with power, management controls, system connectivity between the system control unit and the plurality of nodes, and an external network connection to a user infrastructure, wherein the system fabric comprises at least two high-speed switches controlling the system connectivity and providing memory access to the nodes,
wherein the system control unit and the carrier board provide integrated, shared resources comprising at least one of cooling and power resources for the plurality of nodes, wherein the computer system is provided in a single enclosure, wherein the temperature sensors monitor a temperature inside the single enclosure, and wherein the system control unit configures the plurality of nodes according to a temperature profile and the temperature inside the single enclosure.

19. The computer system of claim 18, wherein the system control unit selectively controls power consumption of components within the single enclosure based on temperature readings of the temperature sensors.

20. The computer system of claim 19, wherein the system control unit selectively controls power consumption of components within the single enclosure by adjusting at least one of a voltage and a frequency of said components.

21. The computer system of claim 18, wherein the plurality of nodes log measurements of voltage throughput over time, and wherein the system control unit configures the plurality of nodes according to the voltage throughput.

22. The computer system of claim 21, wherein the system control unit configures the nodes according to the voltage throughput to improve at least one of a longevity and a reliability of the plurality of nodes.

23. The computer system of claim 18, further comprising a plurality of microcontrollers that control a plurality of fans disposed within the enclosure.

24. The computer system of claim 18, wherein the plurality of nodes log measurements of fan speed and airflow over time, and wherein the system control unit configures the nodes according to the fan speed and the airflow.

25. The computer system of claim 18, wherein the system control unit reallocates a task from a first node to a second node of the plurality of nodes based on a temperature of said first node and a temperature of said second node.

26. The computer system of claim 18, wherein the system control unit reallocates a task from a first node to a second node the plurality of nodes based on a workload of said first node and a workload of said second node.

* * * * *